United States Patent
Young et al.

(10) Patent No.: US 10,154,492 B2
(45) Date of Patent: Dec. 11, 2018

(54) COMMUNICATION BANDWIDTH

(71) Applicant: Huawei Technologies Co., Ltd., Shenzhen (CN)

(72) Inventors: Robert Young, Cambridgeshire (GB); Brian Martin Gaffney, Cambridge (GB); Benedict Peters, Essex (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 15/068,512

(22) Filed: Mar. 11, 2016

(65) Prior Publication Data

US 2016/0198471 A1 Jul. 7, 2016

Related U.S. Application Data

(63) Continuation of application No. PCT/GB2014/052741, filed on Sep. 10, 2014.

(30) Foreign Application Priority Data

Sep. 11, 2013 (GB) .................................. 1316165.8

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0037* (2013.01); *H04L 25/03* (2013.01);
(Continued)

(58) Field of Classification Search
CPC ........... H04W 52/346; H04W 72/1273; H04W 72/1263; H04W 72/0453; H04W 72/1268;
(Continued)

(56) References Cited

U.S. PATENT DOCUMENTS

| 2004/0082335 A1 | 4/2004 | Hirayama et al. |
| 2006/0088010 A1 | 4/2006 | Buchwald et al. |

(Continued)

FOREIGN PATENT DOCUMENTS

| CA | 2183028 A1 | 2/1997 |
| CN | 101262268 A | 9/2008 |

(Continued)

*Primary Examiner* — Marsha D. Banks Harold
*Assistant Examiner* — Dharmesh Patel
(74) *Attorney, Agent, or Firm* — Leydig, Voit & Mayer, Ltd.

(57) ABSTRACT

A method for allocating bandwidth to communication according to a first communication protocol, the method comprising identifying bandwidth that is allocated to a communication channel for communication according to a second communication protocol and which forms a guard band of the communication channel and allocating the identified bandwidth to communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth.

12 Claims, 17 Drawing Sheets

(51) Int. Cl.
  *H04L 27/00* (2006.01)
  *H04W 16/14* (2009.01)
  *H04W 52/34* (2009.01)
  *H04L 25/03* (2006.01)
  *H04L 29/08* (2006.01)
  *H04L 29/06* (2006.01)
  *H04W 72/12* (2009.01)
  *H04B 7/08* (2006.01)
  *H04B 7/12* (2006.01)
  *H04L 5/16* (2006.01)
  *H04L 27/20* (2006.01)
  *H04L 27/34* (2006.01)
  *H04W 16/06* (2009.01)

(52) U.S. Cl.
  CPC .......... *H04L 27/0008* (2013.01); *H04L 67/12* (2013.01); *H04L 69/22* (2013.01); *H04W 16/14* (2013.01); *H04W 52/346* (2013.01); *H04W 72/1263* (2013.01); *H04W 72/1268* (2013.01); *H04W 72/1273* (2013.01); *H04B 7/0857* (2013.01); *H04B 7/0885* (2013.01); *H04B 7/12* (2013.01); *H04L 5/0023* (2013.01); *H04L 5/0064* (2013.01); *H04L 5/0066* (2013.01); *H04L 5/16* (2013.01); *H04L 27/2017* (2013.01); *H04L 27/2035* (2013.01); *H04L 27/34* (2013.01); *H04W 16/06* (2013.01)

(58) Field of Classification Search
  CPC ....... H04L 69/22; H04L 5/0037; H04L 25/03; H04L 67/12; H04L 27/34; H04L 27/2035; H04L 27/2017; H04L 27/0008; H04L 5/16; H04L 5/0066; H04L 5/0064; H04L 5/0023; H04B 7/12
  See application file for complete search history.

(56) References Cited

U.S. PATENT DOCUMENTS

| | | | |
|---|---|---|---|
| 2009/0088083 | A1 | 4/2009 | Fujii et al. |
| 2009/0275356 | A1 | 11/2009 | Chapman et al. |
| 2011/0158156 | A1* | 6/2011 | Ma ................ H04B 7/15542 370/315 |
| 2011/0205979 | A1 | 8/2011 | Silk et al. |
| 2011/0286370 | A1* | 11/2011 | Tang ................ H04W 72/0446 370/280 |
| 2012/0250591 | A1* | 10/2012 | Diao ................ H04L 5/001 370/280 |
| 2013/0242762 | A1* | 9/2013 | Bennett ............ H04W 72/0486 370/252 |

FOREIGN PATENT DOCUMENTS

| | | |
|---|---|---|
| CN | 101461266 A | 6/2009 |
| CN | 101778392 A | 7/2010 |
| CN | 102035637 A | 4/2011 |
| EP | 1793509 A1 | 6/2007 |
| EP | 2047709 A2 | 4/2009 |
| EP | 2252098 A1 | 11/2010 |
| GB | 2436418 A | 9/2007 |
| JP | H0951321 A | 2/1997 |
| JP | 2000115834 A | 4/2000 |
| JP | 2001309422 A | 11/2001 |
| JP | 2009100452 A | 5/2009 |
| JP | 2009218638 A | 9/2009 |
| WO | 9959362 A1 | 11/1999 |
| WO | WO 0223761 A1 | 3/2002 |
| WO | WO 2008009027 A2 | 1/2008 |

\* cited by examiner

COMMUNICATION BANDWIDTH

CROSS-REFERENCE TO RELATED APPLICATIONS

This application is a continuation of International Patent Application No. PCT/GB2014/052741, filed on Sep. 10, 2014, which claims priority to United Kingdom Patent Application No. GB1316165.8, filed on Sep. 11, 2013, both of which are hereby incorporated by reference in their entireties.

TECHNICAL FIELD

Embodiments of the disclosure relate to allocating bandwidth to communications in a wireless network.

BACKGROUND

Mobile Network Operators (MNOs) across the world need an ultra-low cost air interface in licensed spectrum for the rapidly emerging Internet-of-Things (IoT) segment. The system is preferably deployed in licensed spectrum to assure a quality of service, preferably supports ultra-low cost terminals each with very long battery life, is scalable to huge numbers of terminals per node, and yet is secure, easy to access and robust. The challenge is to identify bandwidth that is both available and capable of providing the required air interface.

Therefore, there is a need for a new mechanism for allocating bandwidth to IoT networks.

SUMMARY

According to a first aspect of the disclosure, there is provided a method for allocating bandwidth to communication according to a first communication protocol, the method comprising identifying bandwidth that is allocated to a communication channel for communication according to a second communication protocol and which forms a guard band of the communication channel and allocating the identified bandwidth to communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth.

The method may comprise dividing the identified bandwidth into a plurality of channels and allocating each channel to a communication device configured to operate in accordance with the first communication protocol.

The method may comprise preferentially allocating a first one of said plurality of channels over a second one of said plurality of channels, the second channel being located closer to the communication according to the second communication protocol than the first channel.

The method may comprise associating a power constraint with each of the plurality of channels such that a first one of said plurality of channels is subject to a more restricted power constraint than a second one of said plurality of channels, the second channel being located closer to the communication according to the second communication protocol than the first channel.

The method may comprise leaving an inner guard band between the plurality of channels and a communication according to the second communication channel and an outer guard band between the plurality of channels and the edge of the communication channel, said inner guard band being wider than said outer guard band.

The method may comprise allocating a communication device an uplink channel and a downlink channel that can be used simultaneously.

The method may comprise allocating the communication device an uplink channel that is formed of bandwidth comprised in the guard band of an uplink communication channel for communication according to the second communication protocol and a downlink channel that is formed of bandwidth comprised in the guard band of a downlink communication channel for communication according to the second communication protocol.

The method may comprise comprising scheduling communications with the communication device to occur on the uplink and downlink channel at the same time.

The method may comprise scheduling communications between the communication device and a particular communication terminal with which the communication device is communicating to occur on only one of the uplink and the downlink channel at any one time.

The method may comprise allocating the full width of a downlink channel to a downlink communication according to the first communication protocol.

The method may comprise dividing the uplink channel into a plurality of sub-channels such that each sub-channel can be allocated to a different uplink communication according to the first communication protocol.

The method may comprise individually pulse shaping each communication on an uplink sub-channel.

The method may comprise allocating a communication terminal a plurality of contiguous sub-channels for a single uplink communication.

The method may comprise pulse shaping the single uplink communication onto a single carrier.

The method may comprise scheduling communications on the plurality of sub-channels in dependence on a power with which one or more communication terminals have previously communicated with the communication device so as to avoid a combined receive power at the communication device across the plurality of sub-channels exceeding a predetermined threshold at any one time.

According to a second aspect of the disclosure, there is provided a controller for allocating bandwidth to communication according to a first communication protocol, the controller being configured to identify bandwidth that is allocated to a communication channel for communication according to a second communication protocol and which forms a guard band of the communication channel and allocate the identified bandwidth to communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth.

According to a third aspect of the disclosure, there is provided a method for allocating bandwidth to communications according to a first communication protocol that make use of frequency diversity, the method comprising identifying bandwidth that is allocated to a communication channel for communication according to a second communication protocol and which forms guard bands on either side of that communication channel and allocating a communication device configured to operate according to the first communication protocol a first channel formed from identified bandwidth that is comprised in one of the guard bands and a second channel formed from identified bandwidth that is comprised in another of the guard bands in order that the communication device may use the first and second channels for frequency diversity.

The method may comprise transmitting the same data across the first channel and the second channel.

The method may comprise transmitting the same data successively across the first channel and the second channel.

The method may comprise receiving the data across both the first channel and the second channel only if a receive operation across one or the first or second channels is deemed to have failed.

The method may comprise deriving information from receiving the data across one of the first and second channels and receiving the data across the other of the first and second channels in dependence on that information.

The method may comprise a communication device allocating a communication with a communication terminal to either the first channel or the second channel in dependence on which of the first and second channels is deemed more likely to result in the communication being successfully received.

According to a fourth aspect of the disclosure, there is provided a controller for allocating bandwidth to communications according to a first communication protocol that make use of frequency diversity, the controller being configured to identify bandwidth that is allocated to a communication channel for communication according to a second communication protocol and which forms guard bands on either side of that communication channel and allocate a communication device configured to operate according to the first communication protocol a first channel formed from identified bandwidth that is comprised in one of the guard bands and a second channel formed from identified bandwidth that is comprised in another of the guard bands in order that the communication device may use the first and second channels to achieve frequency diversity.

According to a fifth aspect of the disclosure, there is provided a communication device for communicating according to a first communication protocol, the communication device being configured to communicate over a first channel in accordance with the first communication protocol, said first channel comprising bandwidth comprised in a guard band on one side of a channel in accordance with a second communication protocol, communicate over a second channel in accordance with the first communication protocol, said first channel comprising bandwidth comprised in a guard band on the other side of said channel in accordance with a second communication protocol and use the first and second channels to apply frequency diversity to communications in accordance with the first communications protocol.

According to a sixth aspect of the disclosure, there is provided a method for allocating bandwidth to communications according to a first communication protocol, the method comprising identifying, in a part of the spectrum that is divided into a plurality of channels for communication according to a second communication protocol, at least two of those channels that are: (i) separated from each other by at least one other channel for communication according to the second communication protocol, and (ii) available for communication according to the first communication protocol; and allocating a communication device configured to operate according to the first communication protocol a first channel formed from bandwidth comprised in one of the two identified channels and a second channel formed from bandwidth comprised in the other of the two identified channels, in order that the communication device may use the first and second channels to apply frequency diversity to communications made in accordance with the first communications protocol.

The method may comprise transmitting the same data across the first and second channels.

The method may comprise transmitting said data simultaneously across both of the first and second channels.

The method may comprise selecting which channel to use to receive data in dependence on a signal quality experienced across one or both of the first and second channels.

The method may comprise selecting which channel to use to receive data in dependence on a signal quality experienced across one or both of the first and second channels during a previous receive operation.

The method may comprise selecting which channel to use to receive data in dependence on a success associated with a previous receive operation across one or both of the first and second channels.

The method may comprise, if the preceding receive operation was successful, using the same channel to receive the data as was used during that preceding operation; and if the preceding receive operation was not successful, using a different channel to receive the data than was used during that preceding operation.

The method may comprise transmitting said data across the second channel after transmitting it across the first channel.

The method may comprise delaying the transmission across the second channel by a length of time that is known to the intended recipient of said data.

The method may comprise delaying the transmission across the second channel by a length of time that exceeds the maximum length of time that it will take to receive said data.

The method may comprise receiving the data across both the first channel and the second channel.

The method may comprise the data across both the first channel and the second channel only if a receive operation across one of the first or second channels is deemed to have failed.

The method may comprise deriving information from receiving data across one of the first and second channels and receiving data across the other of the first and second channels in dependence on that information.

The method may comprise combining data received across the first and second channels.

The method may comprise a communication device allocating a communication with a communication terminal to either the first channel or the second channel in dependence on which of the first and second channels is deemed more likely to result in the communication being successfully received.

The method may comprise a communication device forwarding measurements of signal quality across the first and second channels to the communication device.

The method may comprise allocating the first and second channels only to communication devices that are considered to be suffering from poor signal quality and allocating other communication devices just one channel.

The method may comprise dividing at least one of the two identified channels into plurality of channels for communication according to the first communication protocol.

The method may comprise allocating at least one of said plurality of channels to a different communication device from another of said plurality of channels.

According to a seventh aspect of the disclosure, there is provided a controller for allocating bandwidth to communications according to a first communication protocol, the controller being configured to identify, in a part of the spectrum that is divided into a plurality of channels for communication according to a second communication protocol, at least two of those channels that are: (i) separated from each other by at least one other channel for communication according to the second communication protocol; and (ii) available for communication according to the first communication protocol; and allocate a communication device configured to operate according to the first communication protocol a first channel formed from bandwidth comprised in one of the two identified channels and a second channel formed from bandwidth comprised in the other of the two identified channels, in order that the communication device may use the first and second channels to apply frequency diversity to communications made in accordance with the first communications protocol.

According to an eighth aspect of the disclosure, there is provided a communication device for communicating according to a first communication protocol, the communication device being configured to communicate over a first channel in accordance with the first communication protocol, communicate over a second channel in accordance with the first communication protocol, said first and second channels being formed from bandwidth that is in a part of the spectrum that is divided into a plurality of channels for communication according to a second communication protocol, the first and second channels being formed from respective ones of those channels for communication according to the second communication protocol that are separated from each other by at least one other channel for communication according to the second communication protocol and use the first and second channels to apply frequency diversity to communications made in accordance with the first communications protocol.

According to a ninth aspect of the disclosure, there is provided a method for allocating bandwidth to communication according to a first communication protocol in such a way as to minimise interference to communication according to a second communication protocol, the method comprising allocating bandwidth to form a plurality of channels in accordance with the first communication protocol, said channels having a different width from channels that are defined by the second communication protocol and individually determining a transmit power for each of said plurality of channels such that a power envelope formed by transmitting data across said plurality of channels in accordance with the first communication protocol substantially conforms to a power envelope that the second communication protocol defines for transmitting data across the allocated bandwidth.

The method may comprise individually determining the transmit power such that at least one of said plurality of channels is assigned a transmit power that is different from another of said plurality of channels.

The method may comprise allocating the plurality of channels to communication terminals in dependence on one or more of: a location associated with the communication terminal, a signal quality experienced by the communication terminal and a type of data to be transmitted to or from the communication terminal.

The method may comprise preferentially allocating channels that are assigned higher transmit powers to communication terminals that are experiencing poor signal quality.

The method may comprise preferentially allocating channels that are assigned higher transmit powers to data that is associated with high importance.

The method may comprise allocating a communication device more than one of said plurality of channels and assigning the combination of those allocated channels a transmit power that is an average of the transmit powers that were determined individually for those allocated channels.

The method may comprise determining that having one or more of the plurality of channels transmit at a higher power, which will cause the power envelope of the plurality of channels to deviate from the power envelope defined by the second communication protocol, will not cause unacceptable interference to communication according to the second communication protocol and controlling transmissions across the one or more plurality of channels to occur at that higher power.

The method may comprise allocating a different number of the plurality of channels to uplink communications from downlink communications.

According to a tenth aspect of the disclosure, there is provided a controller for allocating bandwidth to communication according to a first communication protocol in such a way as to minimise interference to communication according to a second communication protocol, the controller being configured to allocate bandwidth to form a plurality of channels in accordance with the first communication protocol, said channels having a different width from channels that are defined by the second communication protocol and individually determine a transmit power for each of said plurality of channels such that a power envelope formed by transmitting data across said plurality of channels in accordance with the first communication protocol substantially conforms to a power envelope that the second communication protocol defines for transmitting data across the allocated bandwidth.

According to an eleventh aspect of the disclosure, there is provided a communication device for communicating according to a first communication protocol in such a way as to minimise interference to communication according to a second communication protocol, the communication device being configured to transmit data over one of a plurality of channels in accordance with the first communication protocol, said plurality of channels having a different width from channels that are defined by the second communication protocol and control its transmit power over that channel such that its transmission, in conjunction with transmissions over others of said plurality of channels in accordance with the first communication protocol, forms a power envelope that substantially conforms to a power envelope that the second communication protocol defines for transmitting data across the bandwidth that is allocated to the plurality of channels.

According to a twelfth aspect of the disclosure, there is provided a method for allocating bandwidth to communication according to a first communication protocol, the method comprising identifying bandwidth that forms part of a channel for communication according to a second communication protocol, dividing the identified bandwidth into a plurality of channels for allocating to communications according to the first communication protocol and assigning one or more constraints to each channel, said constraints being applied non-uniformly across the identified bandwidth in dependence on the location of each allocated channel within the channel for communication according to the second communication protocol.

According to a thirteenth aspect of the disclosure, there is provided a controller for allocating bandwidth to communication according to a first communication protocol, the controller being configured to identify bandwidth that forms part of a channel for communication according to a second communication protocol, divide the identified bandwidth into a plurality of channels for allocating to communications according to the first communication protocol, and assign one or more constraints to each channel, said constraints being applied non-uniformly across the identified bandwidth in dependence on the location of each allocated channel within the channel for communication according to the second communication protocol.

According to a fourteenth aspect of the disclosure, there is provided a communication device for communicating according to a first communication protocol, the communication device being configured to communicate over a channel in accordance with the first communication protocol, said channel being one of a plurality of channels formed from bandwidth that is comprised in a channel for communication according to a second communication protocol and control the communication to comply with one or more constraints applied to the channel such that the communication, in conjunction with communications over others of the plurality of channels, embodies a non-uniform application of constraints across the bandwidth occupied by the plurality of channels, said constraints being applied in dependence on the location of each of the plurality of channels within the channel for communication according to the second communication protocol.

BRIEF DESCRIPTION OF DRAWINGS

Embodiments of the disclosure will now be described by way of example with reference to the accompanying drawings. In the drawings.

DETAILED DESCRIPTION

A wireless communication network typically has an amount of bandwidth available to it that can be divided into channels. Those channels can then be allocated to different communications as the network sees fit. In one scenario a network may be configured to operate in a part of the spectrum that is used by another network too. Typically that other network will use a different communication protocol. The part of the spectrum that it uses will also already be "divided up" into channels that are suitable for communication according to that other communication protocol. Many of the methods described herein take bandwidth that is already divided up into channels for one protocol and substitute those channels for channels that are suitable for use by another protocol. In many instances the onus will be on the "hosted" network to ensure that its communications cause minimal interference to its "host" network. This will usually be because the other network was established first in that part of the spectrum or it may be because the spectrum in question is predominantly owned or used by the other network and/or its operators.

Various methods are described herein whereby a hosted communication network can minimise the interference that it causes to its host network. Predominantly these methods are described with reference to an IoT network trying to minimise interference to a host network. This is for the purposes of example only and it should be understood that the methods described herein may be applied to minimise the interference caused by any communication network to another. Similarly two particular host networks are described: a 2G network (specifically a GMSK network like GSM) and a 4G network (specifically LTE). Again it should be understood that the methods described herein are generally applicable to any suitable host network.

Figure 1:
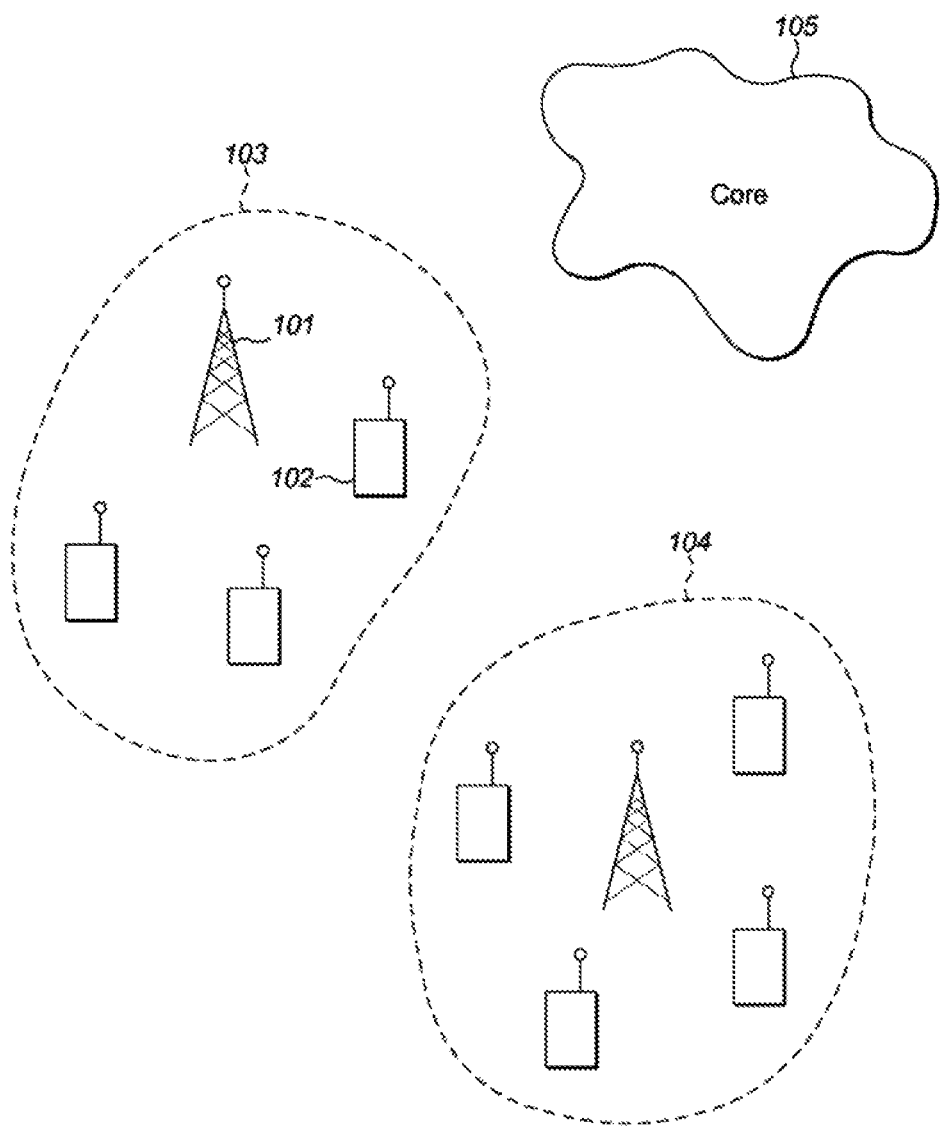
FIG. 1 shows an example of a communication network.

An example of an IoT network is shown in FIG. 1. Typically the network will consist of a number of base stations 101 that are each configured to communicate with a large number of geographically spaced terminals 102. The network may be a cellular network, with each communication device being responsible for over the air communications with terminals located in a respective cell 103, 104. The base stations suitably communicate via a wired or wireless interface with a core network 105 and may act, at least partially, under the core network's control. The core network may be implemented wholly or partially in the cloud. An IoT network may be configured to operate according to a specific IoT protocol. An example is the Weightless™ protocol, although the methods described herein may be readily implemented by networks configured to operate according to any IoT protocol. The communication devices may be also be configured to operate according to a host protocol in addition to an IoT protocol.

In one method described herein, bandwidth is allocated to communication according to a first communication protocol by first identifying bandwidth that forms part of a channel for communication according to a second communication protocol. That bandwidth may be divided into a plurality of channels. Each channel can be allocated to a communication device or apparatus configured to operate in accordance with the first communication protocol. Each channel is preferably made subject to one or more constraints. These constraints are preferably applied non-uniformly across the identified bandwidth in dependence on the location of each allocated channel within the channel for communication according to the second communication protocol (i.e. the hosted channel's location within the host channel that provided the bandwidth for the hosted channel).

A communication channel usually incorporates upper and lower guard bands to reduce the risk of communications in neighbouring channels from interfering with each other. According to another method of allocating bandwidth described herein, bandwidth comprised in the guard band of a channel allocated to one communication protocol may be used by another communication protocol.

The specific examples of this idea described herein make use of LTE (Long Term Evolution) guard bands to provide bandwidth for IoT communications. The narrow bandwidth that guard bands provide are particularly suitable for IoT communications, which are typically tolerant of delays and low bit rates that would be impractical in most other networks. IoT protocols also tend to be optimised for low power operation since many IoT terminals are small, battery-powered devices. Limited power transmissions may be preferred when using guard bands to minimise the risk of interference to the host system so IoT communications are well suited to this application. These are only examples, however, and any suitable communication systems and protocols might utilise the methods and apparatus described herein.

The bandwidth that is potentially available for IoT communications in LTE guard bands is preferably not treated as a uniform block. Instead, portions of the available bandwidth that are located close to a communication according to the host protocol are preferably subject to greater constraints than more remote portions of the available bandwidth (the host communication will usually be predominantly confined within a frequency range positioned centrally in the host channel). These constraints restrict allocation of the potentially-available bandwidth. Examples of the restrictions that may be imposed include one or more of: increased power constraints for inner portions of bandwidth; restrictions on channel allocation to favour outer portions of bandwidth; and setting asymmetric guard bands for the innermost and outermost IoT channels that mean that a larger section of the inner bandwidth is rendered unavailable for IoT communications. The non-uniform nature of these restrictions may allow the guard band bandwidth to be exploited to its fullest extent while minimising interference with the host system.

Each of the host channels will have two guard bands: an upper and a lower. These guard bands are spaced by the resource block in which host communications occur. The upper and lower guard bands are therefore separated in frequency. This may be exploited for frequency diversity by allocating a communication device a pair of channels: one in the upper guard band and one in the lower guard band. The spaced channels may be used for transmissions by the communication device (e.g. a base station) or for transmissions by a communication terminal with which the communication device is communicating.

Other specific examples described herein make use of 2G channels to provide bandwidth for IoT communications. The IoT network may use entire channels from the 2G network. Those channels may be widely spaced within the host bandwidth. The IoT network may exploit this separation to achieve frequency diversity in a similar way to the use of upper and lower guard bands. For example, a communication device (base station or terminal) may be allocated one channel formed from bandwidth comprised in one host channel and another channel formed from bandwidth comprised in a completely different host channel. Suitably the two host channels are separated by at least one host channel. The intervening host channels are likely to be assigned to communications by the host network. The resulting frequency spacing can be exploited by the IoT to achieve frequency diversity.

It is important for the IoT network to minimise interference with the 2G network. The IoT network may use channels of different widths and/or make use of different modulation schemes but it should preferably appear to be just another 2G channel to its 2G neighbours. A method by which interference with a 2G host network may be minimised is by individually controlling the transmit power of multiple channels to approximately mimic a power envelope defined by the host communication protocol. Preferably the power spectrum across the multiple channels substantially conforms to the power envelope defined by the host protocol. Thus exact conformance is not required, but the power envelope across the multiple channels should be sufficiently close to the allowable power envelope so as not to cause an unacceptable level of interference to any neighbouring host channels. One consequence of mirroring the power envelope of the host network is that the transmit power of the multiple channels will often not be uniform across those channels; the transmit power will often vary according to the position of a particular channel within the host channel that provided its bandwidth.

Cellular IoT

Existing M2M or IoT devices that need to communicate over long distances generally use GPRS or SMS over a standard 2G (e.g. GSM) network. In some respects, the 2G cellular systems are quite well suited for the machine-to-machine (M2M) communications of an IoT network due to their almost global availability in some frequency bands (the 900 MHz band being an example) and the relatively low cost of 2G terminals. The limited maximum data rate of 2G compared with 3G and 4G networks is typically not important for M2M applications. Existing 2G systems do have some important limitations in the context of M2M applications, however:

1. The 2G terminal cost is often too high for some applications, particularly in comparison with competing technologies;
2. The 2G protocols are not designed to support the tens of thousands of M2M terminals that may exist in a single cell;
3. The indoor penetration of 2G is insufficient for some applications; and
4. The battery life of 2G terminals is far too short for many M2M applications.

An alternate cellular system that is optimised for M2M communication and which overcomes the limitations of existing 2G networks when used for M2M may be referred to as "Cellular IoT".

Channel Division

Figure 2:
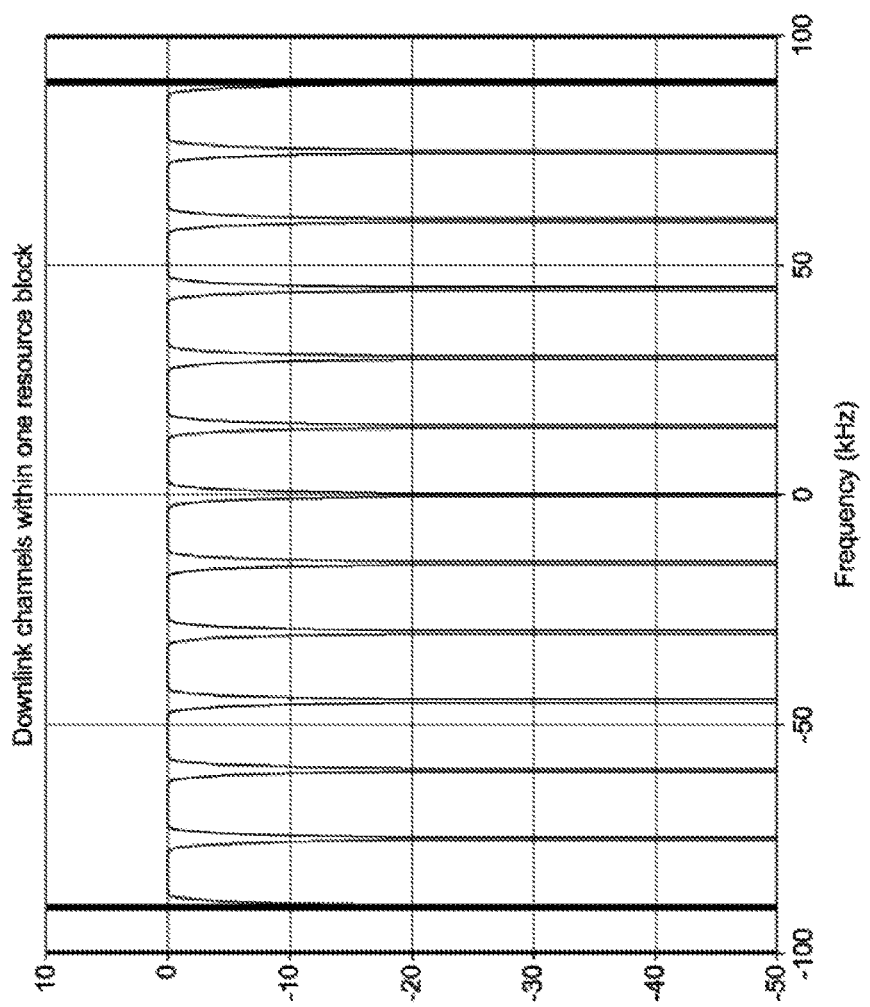
FIG. 2 shows multiple downlink channels within one resource block.

A desirable characteristic of a Cellular IoT system is that it can be deployed within an existing 200 kHz GSM channel (on both the downlink and uplink). A GSM operator has access to many contiguous GSM channels in a given band, which form their overall 2G deployment. By reassigning a small number of these channels to Cellular IoT (potentially just one channel on each of the downlink and uplink), an operator may be able to deploy an optimised IoT network for M2M. Channels could be assigned to Cellular IoT on an individual basis or as a contiguous group. FIG. 2 shows an example of a 200 kHz downlink frequency channel sub-divided into 12 sub-channels.

In order to optimise a Cellular IoT system for M2M/IoT applications, the modulation methods and modulation bandwidths may need to be changed compared with standard 2G modulation techniques. In particular, the 200 kHz channel used for the downlink and/or the uplink may be sub-divided into many narrow sub-channels. This division has a number of important benefits:
1. It allows flexible frequency planning of the downlink and uplink by assigning different subsets of sub-channels to neighbouring base stations in order to reduce inter-cell interference. Furthermore, different sub-channels may operate with different frequency re-use factors depending on the nature of the traffic that they carry.
2. It greatly increases the uplink capacity of the network by allowing multiple terminals to transmit simultaneously through frequency division multiple access (FDMA).
3. It simplifies the equalisation required at the terminal receiver because each of the downlink sub-channels is sufficiently narrow in bandwidth that it is subject only to flat-fading (in the same manner as an OFDM sub-carrier). This may reduce the cost of the terminal.

Power Spectrum

The use of different modulation schemes and bandwidths for Cellular IoT transmissions compared with existing GSM transmissions may create concerns regarding co-existence between the Cellular IoT system and the existing GSM system, which may be operating on an adjacent (or second-adjacent) channel. Regulators who have approved the use of GMSK modulation in particular frequency bands may particularly have concerns over allowing an alternate modulation system in the same band that has different spectral properties.

Figure 3:
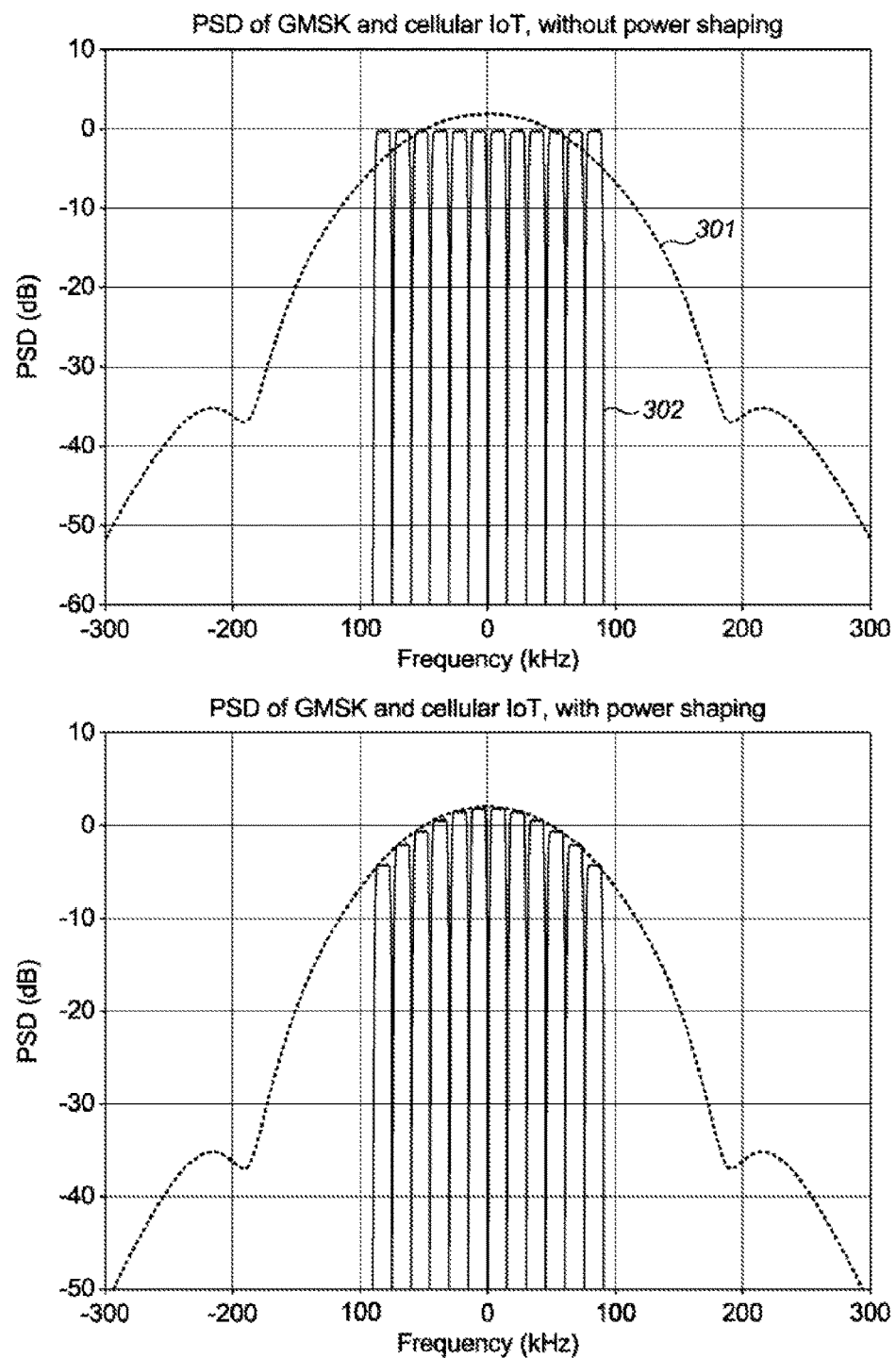
FIG. 3 shows power spectra of GMSK and cellular IoT transmissions.

An example of these spectral properties is illustrated in the upper plot in FIG. 3. This plot shoes the standard GMSK frequency spectrum at 301 overlaid with 12 Cellular IoT sub-channels at 302. In this example, each of the Cellular IoT sub-channels has a 3 dB bandwidth of 12 kHz and a spacing of 15 kHz. It can be seen that in some parts of the 200 kHz channel, the Cellular IoT power spectral density has the potential to be higher than for GMSK, whereas for other parts of the channel the Cellular IoT power spectrum has the potential to be lower than for GMSK.

A preferred approach is for the power spectral density of the IoT signal across its multiple sub-channels to approximate the overall power spectral density of a standard deployment in the host system. To achieve this the transmit power levels used for each Cellular IoT sub-channel may be individually determined rather than assuming equal power for each sub-channel. The transmit power levels in each sub-channel are suitably set at the same level as for a standard host channel in the corresponding frequency range. This is illustrated in the lower plot in FIG. 3. If the transmit power for a standard host channel varies across the corresponding frequency range, the transmit power level for the Cellular IoT channel may be set to any of the minimum power of the host across the frequency range, the maximum power or an average power. The most appropriate power may depend on the actual level of interference that might be caused to the host and/or the host's ability to withstand it.

This approach has several benefits:
1. By approximating the transmit power on each Cellular IoT sub-channel to the transmit power within the same frequency range if the channel was being used with a standard GMSK signal, the interference caused to adjacent GSM channels is likely to be similar to that caused by a normal GMSK signal. Therefore, the Cellular IoT transmissions are likely to be acceptable in terms of the impact on GSM network performance.
2. Cellular IoT sub-channels that are closest to the centre of the channel may actually use a higher transmit power than in the case of a uniform distribution of power across all sub-channels (for a fixed total transmit power to the Cellular IoT system). This can be seen by comparing these sub-channels between the upper and lower plots in FIG. 3. The central Cellular IoT channels may be preferentially allocated to traffic to/from terminals at the extremes of coverage (including for broadcast information that must reach all terminals in the cell). This can result in an improvement in overall system coverage and capacity.
3. The outermost Cellular IoT sub-channels may be preferentially allocated to carrying traffic to/from terminals that have non-worst case link budget (for example terminals that are not deep indoors) and can therefore tolerate the reduction in available transmit power on these sub-channels.

This scheme may be used on either the downlink or the uplink or both. When used on the downlink, the base station may only use a subset of the sub-channels. Typically the base station will use at least 3 sub-channels and will use at least one channel that is used for broadcast information. When used on the uplink, each terminal may only use a single sub-channel or it may use several sub-channels that are bonded together into a wider bandwidth sub-channel. In this bonded example, the allowed transmit power may be approximated by the average power level of the GMSK signal over the bandwidth of the bonded sub-channel.

The number of downlink and uplink sub-channels may be different, and there may be benefits in terms of uplink capacity in having a larger number of uplink channels compared with downlink channels.

The allowed transmit power on each sub-channel may deviate from the GMSK template where it is calculated that the impact on coexistence is acceptable. For example, higher transmit power may be allowed due to the lower side-lobe emissions from the Cellular IoT transmissions in comparison with the GMSK transmission.

Although the concept has been described in the context of a Cellular IoT deployment within a GSM band, it should be understood that it is also broadly applicable to any other type of deployment. In non-GSM deployments, the power shaping of the Cellular IoT sub-channels follows a template that is derived from whatever modulation is applied in the host system that is replaced by the Cellular IoT system.

This concept may be particularly beneficial in implementations in which the two communication protocols are of different widths. In the Cellular IoT example, the host channels are wider of the two but this concept might equally be applied in implementations in which the host channels are narrower.

Diversity

Depending on the location of the terminal and the nature of the multipath that exists between the base station and the terminal, it is possible that the downlink signal received at the terminal could be substantially attenuated due to fading of the 200 kHz channel. This is a particular problem when the terminal is static and the primary reflectors creating the multipath are also static. In this situation fades may be relatively unchanging over time. Similar issues typically exist in the uplink but a typical base station has multiple receiver antennas, meaning that receive spatial diversity is available to address the problem. The techniques described below might equally be applied to the uplink as the downlink if needed, however.

Established methods for mitigating this problem include:
1. Using frequency hopping between many channels in order to provide frequency diversity. This would require more channels to be allocated to the Cellular IoT system and therefore a larger spectrum allocation, which must come at the expense of existing GSM services. Also, because the bulk of IoT traffic is short, infrequent "datagrams" rather than streaming voice or data, it is possible that random frequency hopping would still lead to many failed receptions for a given terminal. The characteristics of IoT traffic mean that the cost of failed receptions can be quite high, especially for downlink control information which defines the allowed opportunities for a terminal to transmit on the uplink.
2. Using a much larger channel bandwidth, so that the signal is not subject to flat fading across the entire received signal bandwidth. This is not attractive for Cellular IoT because it would increase the occupied spectrum from 200 kHz to several MHz in order to provide reliable frequency diversity.
3. Employing transmit spatial diversity by exploiting multiple transmitter antennas at the base station. Typical GSM base stations only have a single transmit antenna per sector, however, and upgrading the installations is likely to be prohibitively expensive.
4. Receiver spatial diversity by exploiting multiple receiver antennas at the terminal. This increases the cost of the terminal, which may be unacceptable for many IoT applications.

A solution may be to allocate a small number of downlink channels to the Cellular IoT system (e.g. two channels) but separated by a relatively large number of channel spacings. This does mean that the minimum spectrum allocation required for a deployment is increased by at least a factor of two. The allocated channels should be preferably separated by several MHz, so that they are reliably decorrelated. In this Cellular IoT example, that spacing corresponds to a multiple of 5, 10 or perhaps up to 15 times the width of a Cellular IoT channel. Thus, if one downlink channel is subject to deep fade, there is not a significantly increased probability that the other channel is subject to a deep fade at the same time. This is illustrated in FIG. 4.

Figure 4:
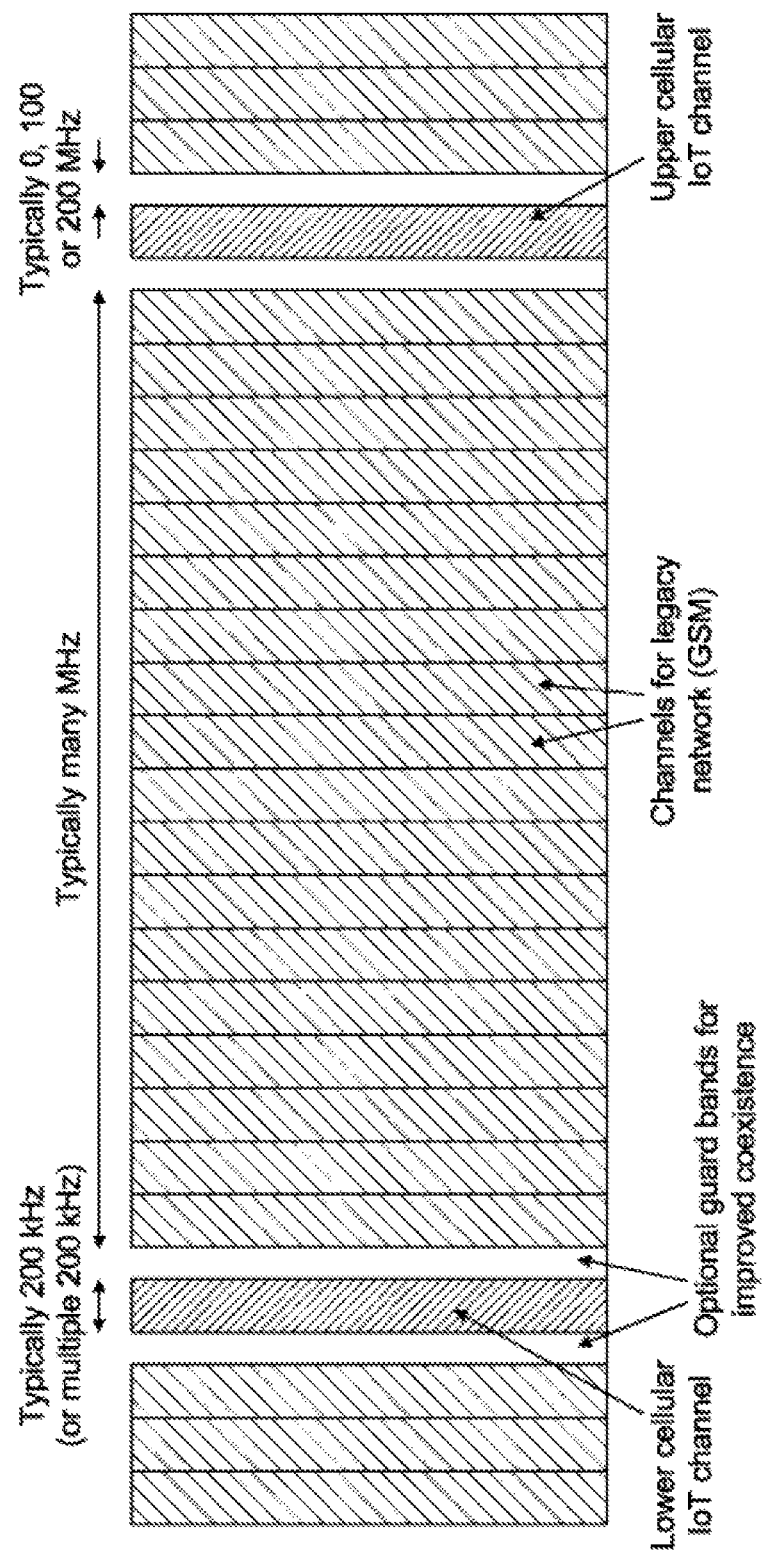
FIG. 4 shows an allocation of channels.

FIG. 4 shows two Cellular IoT channels: an upper channel and a lower channel. In this example each Cellular IoT channel is formed from bandwidth corresponding to a contiguous group of two or three GSM channels. This enables part of the bandwidth has been taken from the GSM system to be used for IoT communications and part of it to be left as a guard band between the Cellular IoT communications and the GSM system.

Using two different host channels to provide frequency diversity is similar to another technique (described below), which is used to deploy an IoT system in the guard bands of the host. The approach described here follows a similar principle and is applicable to deployment in any spectrum where an operator has access to channels spread across a bandwidth that spans a much greater bandwidth than that of an individual channel. Preferably the channels are spread across a total bandwidth many MHz. The channels that the IoT network has access to will usually not be contiguous across that bandwidth (i.e. there will be intervening host channels between the IoT channels).

Due to the relatively large frequency separation between the two or more downlink channels, and the possibility that there could be large signals from another system in the intervening frequency range, a realistic low-cost terminal might only be able to receive one of the Cellular IoT downlink channels at a time. Because relatively low data rates will typically be used in the Cellular IoT system, however (e.g. the minimum instantaneous data rate may be 20 kbits per second or less), the terminal will usually be capable of re-tuning from one downlink channel to another downlink channel very quickly. Suitably the terminal is capable of performing this re-tuning within a small number of symbol durations.

The downlink signal from the base station to the terminal may be used to carry various different types of information, such as:
1. Synchronisation sequences that allow terminals to determine frequency error, symbol timing and frame timing;
2. Broadcast system information that carries network configuration information required by all terminals;
3. Management and control information to individual or multiple terminals;
4. Traffic destined for a specific terminal; and
5. Traffic destined for a group of terminals There are a variety of options for mapping the downlink information onto these two (or more) channels, which are separated in frequency. It may be beneficial to apply different mapping methods for different types of downlink information.

The simplest approach is to replicate the downlink information on all the downlink channels, with the same timing. This enables the terminal to autonomously select its preferred downlink channel to provide the best probability of a successful reception, based on the information available to the terminal about the signal quality on each available channel. This approach is simple and robust, and provides a form of "switched diversity".

The terminal may make its selection of downlink channel in a number of possible ways. It could turn on its receiver sufficiently early relative to the wanted downlink transmission such that it can sense the signal quality on multiple channels before making a decision. Alternatively, it could retain the same channel as previously used if that reception had been successful but otherwise change to a different channel. Alternatively, it could use some signal quality metric from the previous reception to determine whether to continue using the same channel or to speculatively try a different channel.

A further enhancement is to stagger the downlink transmissions on the two (or more) allocated channels in time. This allows the terminal to attempt reception on one downlink channel, and if that fails it can repeat the reception attempt on a different downlink channel (having a delayed transmission of the same information) after re-tuning to the new channel. The duration in time of the stagger should preferably exceed the maximum duration of the transmitted packet in order to allow successive attempts to receive the same information on different channels. This does imply an increase in latency. The duration of the stagger should preferably be a constant value known to the terminal for a given channel or sub-channel. The duration of the stagger may be configurable via broadcast system information To improve latency, the base station could require the terminal to receive from the same downlink channel for all packet receptions between the first packet in a transaction composed of a sequence of packets and the last packet in the transaction. This is effective so long as the coherence time of the channel (which is related to the time for which a deep fade is likely to remain on a given channel) exceeds the total duration of the transaction.

A further enhancement is that the terminal may exploit the staggering in time of the downlink transmissions to allow it to combine the received data from two (or more) channels. This provides the possibility that even if each individual transmission cannot be received correctly, the combined information can allow a successful decode. This may be based on the technique of "maximum ratio combining", which is commonly used in systems that exploit multiple receive antennas or that employ soft-combining of multiple re-transmissions of a packet if the initial transmission fails. The proposed scheme is different from existing schemes that employ maximum ratio combining in that the transmissions are repeated across multiple channels (so on different frequencies) and are staggered in time in a deterministic manner.

A further potential enhancement is that the base station could negotiate with the terminal, based on measurements made by the terminal of the signal quality on the available downlink channels, which downlink channel is used to carry control information and traffic for that terminal. This is beneficial for overall system capacity, but suffers from the problem that the fading on each downlink channel may vary substantially between successive reception attempts by the terminal (given that the terminal may operate with a very low duty cycle in order to conserve its battery life).

One drawback of this approach is that it involves an increase in used bandwidth in proportion to the number of downlink channels, without providing any increase in downlink capacity. However, many IoT applications predominately generate uplink rather than downlink traffic, and so it may be acceptable to use the downlink spectrum less efficiently than the paired uplink spectrum. This is particularly true because in a typical GSM frequency division duplex (FDD) deployment, the number of uplink channels is equal to the number of downlink channels.

In some Cellular IoT systems, the downlink 200 kHz frequency channel is further sub-divided into a number of sub-channels. This is illustrated in FIG. 2 for the case of a downlink channel composed of 12 sub-channels. In this case, each downlink sub-channel may be considered separately in terms of whether the information carried on that sub-channel is replicated on the corresponding sub-channel of another channel allocation. This has the benefit that only downlink sub-channels that are being used to carry information to terminals that are at the limit of their link budget capability (for example, cell-edge terminals) need to be replicated. This would typically include the synchronisation and broadcast information that is required by all terminals. Therefore, the overall spectral efficiency of the system is improved compared with replicating all sub-channels.

Each of the sub-channels could also be used to send data in a different way. The sub-channels could be used to apply different techniques for frequency diversity. So, for example, some sub-channels within a particular channel may be transmitting data at the same time as their counterpart in another channel. Other sub-channels might be used for staggered transmissions with their counterpart. The sub-channels might also be paired off with sub-channels in different channels. So, for example, one sub-channel might be paired off with a sub-channel in one channel, giving a first frequency spacing between those two sub-channels, while its neighbour might be paired with a sub-channel in a completely different channel, giving a second frequency spacing. Terminals might be allocated particular frequency spacings depending on the communication conditions they are currently experiencing.

Any of the techniques described below with respect to diversity in a scheme in which an IoT system is implemented in the guard bands of a host system might also be incorporated into this scheme for Cellular IoT.

IoT in Guard Bands

Another option for allocating bandwidth to an IoT network is to make use of the guard bands prescribed by another communication protocol. In general, bandwidth in a guard band may be considered for use by another communication protocol if the spurious energy from the host transmission in that bandwidth is less than about 10 percent of the IoT transmission power level (i.e. about 10 dB lower), measured in the bandwidth of the IoT transmission. This is not a hard limit but a typical value given for the purposes of illustration. The lower the host transmission power relative to the IoT transmission power, the higher the order of IoT modulation that can be used (e.g. 16 QAM rather than QPSK) and therefore the higher the data rate/capacity of the IoT system.

In the examples below the host network is an LTE system, the IoT protocol is Weightless and the use of LTE guard bands to create Weightless channels is designated Weightless-L or WLL. An air interface for WLL is described, covering the PHY layer and relevant aspects of the MAC layer.

The WLL system has the following attributes:

The proposed WLL system operates in the guard bands either side of an existing LTE carrier. The advantage of this approach is that it decouples the choice of modulation methods and protocols from those that are used for LTE and therefore provides much more opportunity to optimize the system for IoT applications It is optimized for low terminal cost and low terminal power consumption. The MAC protocols are based closely on those developed for the Weightless IoT system, whereas the PHY layer has been adapted to the specific requirements of WLL operation.

The system is designed to trade data rate reduction and increased latency for improved link budget, enabling improved coverage for a given transmit power It has very limited power control and frequency accuracy requirements, which is desirable for IoT systems that generally cannot rely on a fast feedback channel It respects the FDD based allocation of LTE channels Base station scheduling ensures that terminals can operate in half-duplex mode to avoid the need for a duplexer Base stations typically use antenna diversity, but this is not mandated for terminals in order to reduce cost.

The use of the LTE guard bands means that the co-existence issues between LTE and WLL are predominantly related to RF issues associated with transmitter spectral masks and receiver blocking performance.

The proposal is based on the Weightless™ IoT specification. Weightless™ uses a cellular WAN architecture, with protocols optimised for the requirements of an IoT system (low terminal cost, low terminal duty cycles and hence low power consumption, and scalability to very low data rates). It was originally designed to operate in TV Whitespace spectrum from 470 to 790 MHz, but the PHY is generalised to operate in licensed, shared licensed access and license-exempt bands of varying bandwidths.

Channel Allocation

The WLL system uses the guard bands on either side of the LTE resource blocks within each LTE channel.

The expression "LTE resource blocks" refers to the OFDM sub-carriers that are actually used by the LTE system. In OFDM systems it is usual to leave significant guard bands either side of the used sub-carriers. This is partly because the OFDM signal inherently has significant transmit skirts due to the nature of the modulation (there is no pulse shaping) and also because the OFDM signal has high peak to average power ratio (PAPR) which means that any non-linearities in the transmitter chain cause significant spectral regrowth. The guard bands leave some margin for a realistic transmitter to meet the overall channel spectral mask and so avoid spurious emissions in the adjacent channel. For OFDM systems, guard bands of 5 to 10% of the overall channel bandwidth are typical (for LTE the guard bands are 5% of the channel bandwidth on each side of the LTE signal, for example 2×500 kHz for a 10 MHz LTE channel). The most suitable guard bands for implementing the methods described herein are bands that are around 5% or more of the channel bandwidth on each side of the "host" signal. This is not a hard limit; it just means that there is a reasonable amount of available bandwidth for the WLL signal and therefore reasonable WLL capacity can be achieved in comparison with the host system.

The system adheres to the FDD structure used by LTE, so the guard bands adjacent to the downlink LTE channel are used for the WLL downlink, whilst the guard bands adjacent to the uplink LTE channel are used for the WLL uplink.

To avoid the need for a duplexer in the WLL terminal, the base station scheduler preferably ensures that a terminal is not required to transmit at the same time that it is required to receive. In other words, the terminals operate using half-duplex FDD, while the base station operates using full-duplex FDD. Whilst this approach does marginally reduce the theoretical maximum throughput for the combined downlink and uplink for a given terminal, and also means that uplink traffic cannot be scheduled at the same time as downlink broadcast control traffic, the capacity impact is modest and the savings in terminal cost is the key consideration.

Downlink

For a 10 MHz LTE downlink channel, the bandwidth of the guard bands either side of the LTE resource blocks is 500 kHz.

Figure 5:
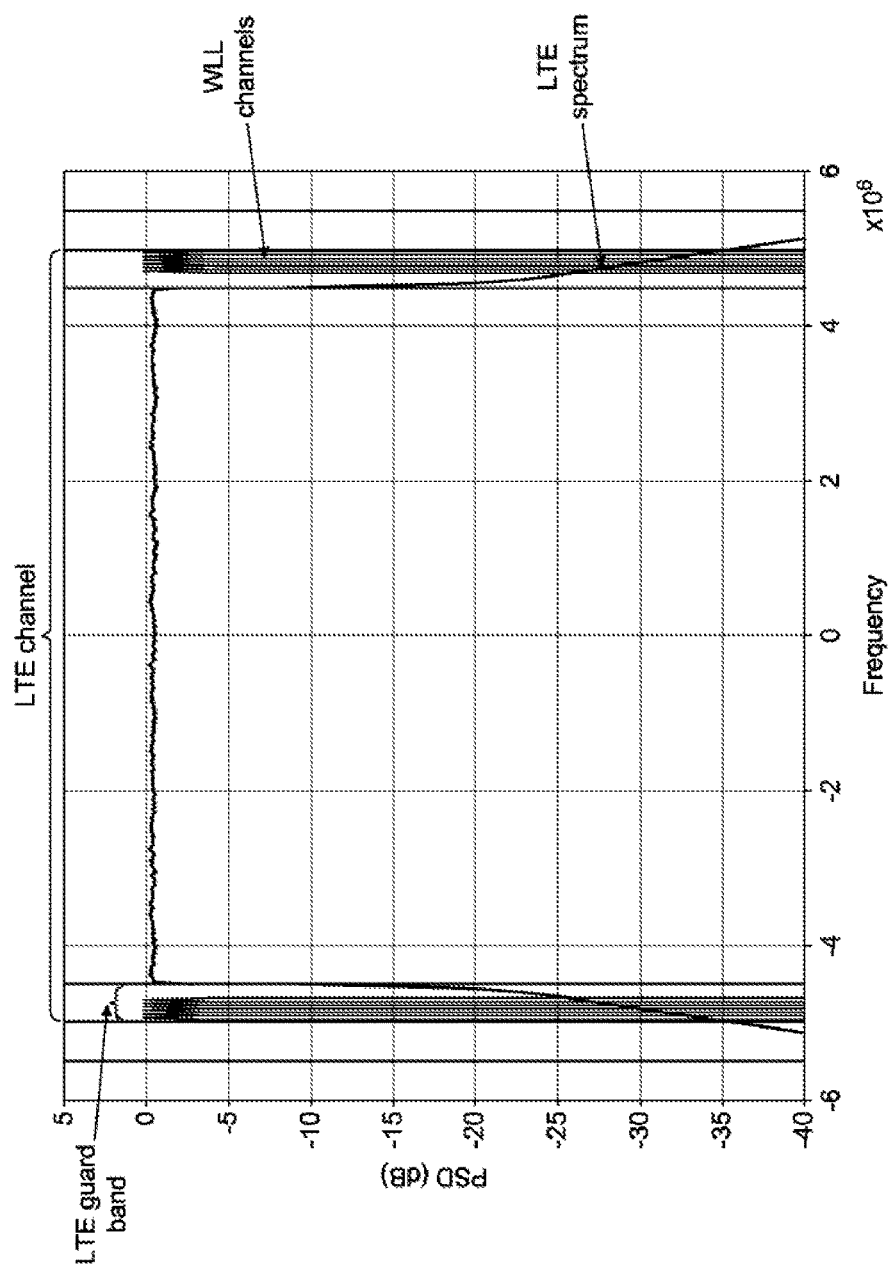
FIG. 5 shows a typical LTE spectrum.
Figure 6:
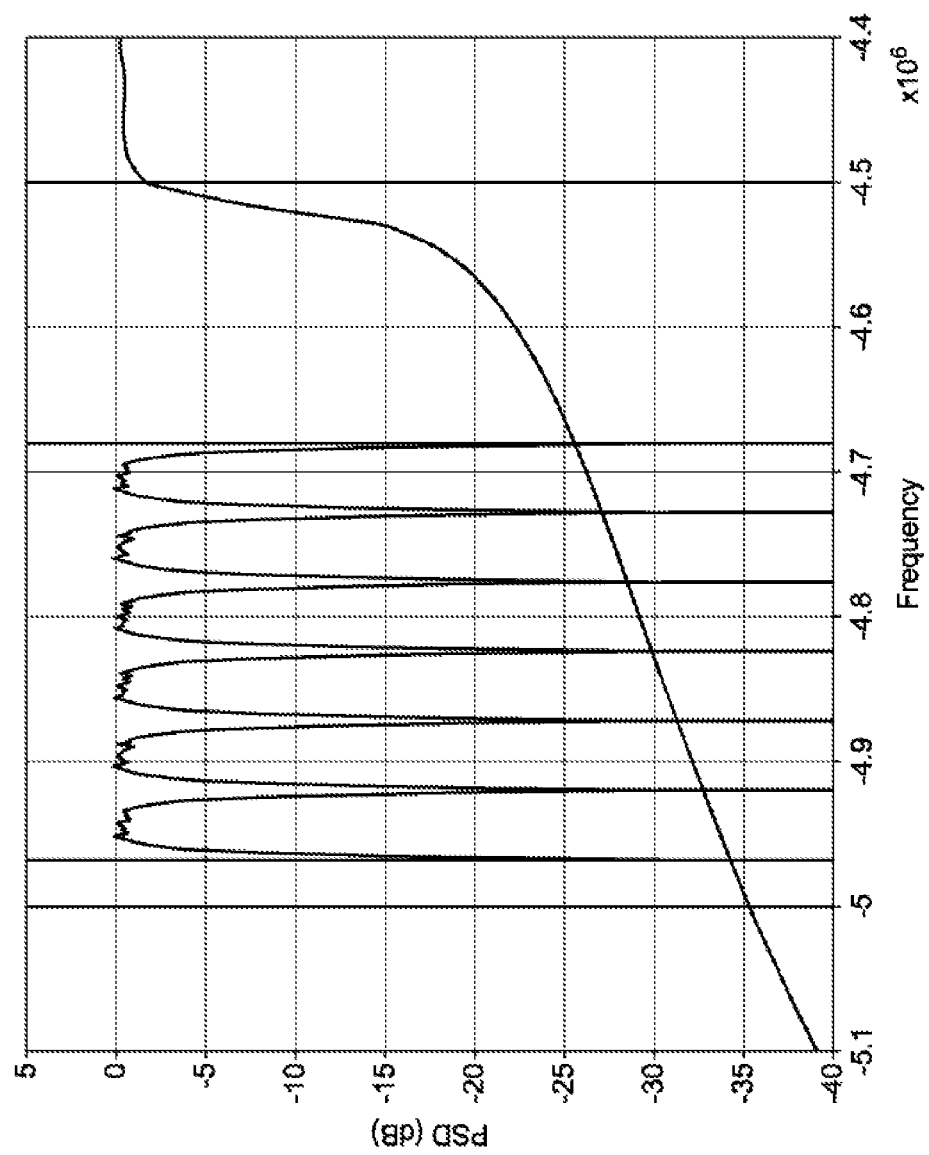
FIG. 6 shows an LTE guard band with the proposed WLL channels.

One option is to divide each guard band into multiple WLL downlink channels as follows:
  A residual outer guard band of 32 kHz between the outermost WLL channel and the adjacent LTE channel
  Six contiguous 48 kHz WLL channels, providing an aggregate frequency re-use factor of $1/12$ across a pair of guard bands
  A residual inner guard band of 180 kHz between the innermost WLL channel and the closest LTE resource block This is illustrated in FIG. 5, which shows the entire LTE channel, and in more detail in FIG. 6, which shows a single LTE guard band.

For other LTE channel bandwidths, the bandwidth of the WLL channels and the bandwidth of the residual guard bands are scaled in proportion to the bandwidth of the LTE guard band. Therefore, the number of WLL channels remains fixed.

The widths of the residual inner and outer guard bands are asymmetric to minimise interference between LTE resource blocks and the WLL carrier. The priority is to maximise the frequency separation from the LTE resource blocks to the WLL channels, whilst also meeting the overall transmit mask (or allowable power density spectrum) for the LTE channel.

WLL downlink channels are allocated to different WLL base stations in order to allow frequency planning of the network. Since there are a total of 12 WLL channels per LTE channel, the maximum supported frequency re-use factor is $1/12$ for a deployment that uses a single LTE downlink channel.

Outer WLL channels are preferentially allocated to base stations when the full frequency re-use is not required and when the network is not capacity limited. This minimises any potential for interference with the LTE resource blocks due to the increased frequency separation. Similarly, power control of the WLL channels may be necessary to control the potential for interference, which could require some interaction with the LTE base stations/network. In this case, the outer WLL channels will support higher transmit power than the inner channels.

Optionally, multiple WLL channels may be allocated to a single WLL base station to increase capacity when a lower frequency reuse factor is acceptable or when multiple LTE channels are available. However, a particular WLL terminal is only required to receive a single WLL channel in a given time slot. This constrains the maximum data rate to each terminal, but means that the terminal receiver filtering is simplified.

The WLL downlink uses time division multiple access (TDMA), so that transmissions to different terminals are separated in time. Frequency division multiple access (FDMA) may not be used within a given WLL downlink channel because there is no particular benefit for an IoT system.

Uplink

For a 10 MHz LTE uplink channel, the 500 kHz guard band may be divided into 12 WLL 48 kHz uplink channels in the same manner as for the downlink. The scaling for other LTE channel bandwidths is also the same as for the downlink.

In order to avoid additional complexity, there may be a one-to-one association between the allocations of downlink WLL channels to a given base station and the allocations of uplink WLL channels to the same base station.

Figure 7:
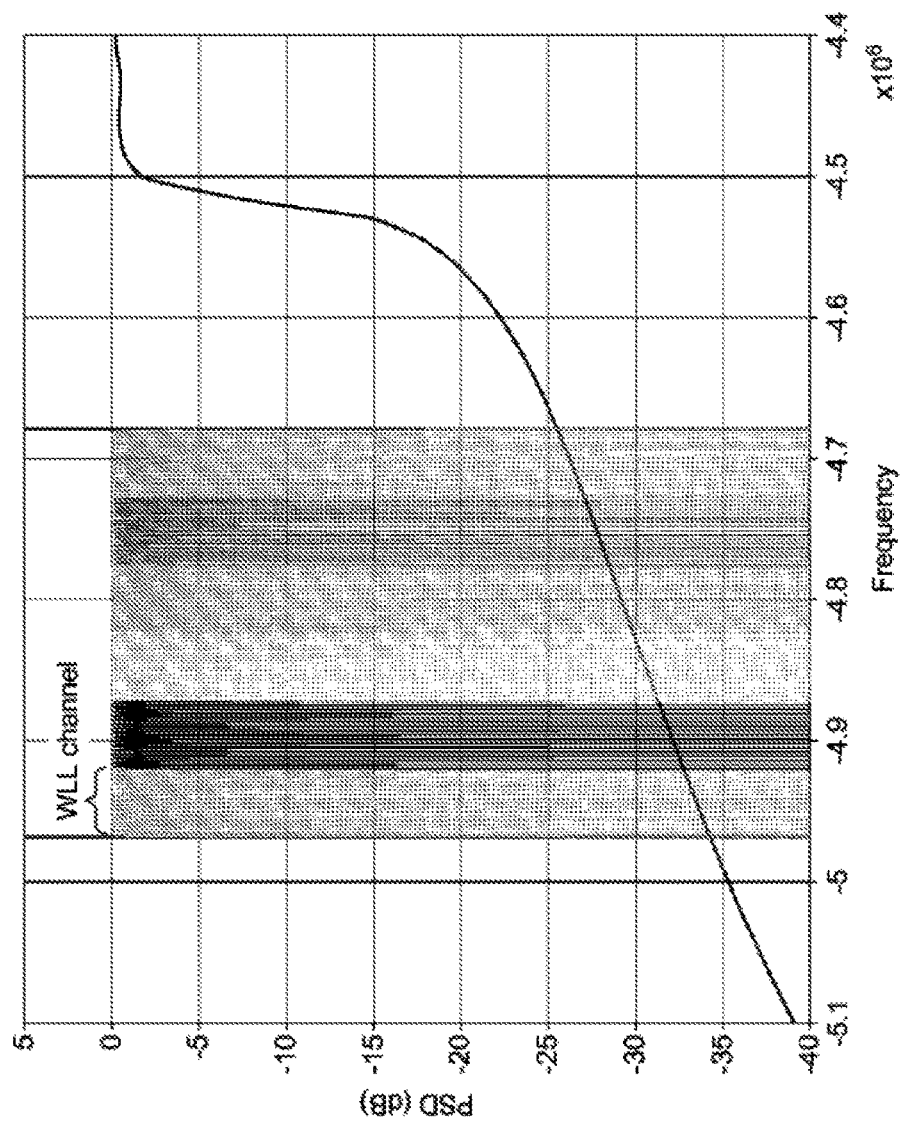
FIG. 7 shows uplink WLL channels subdivided into 16 sub-channels.
Figure 8:
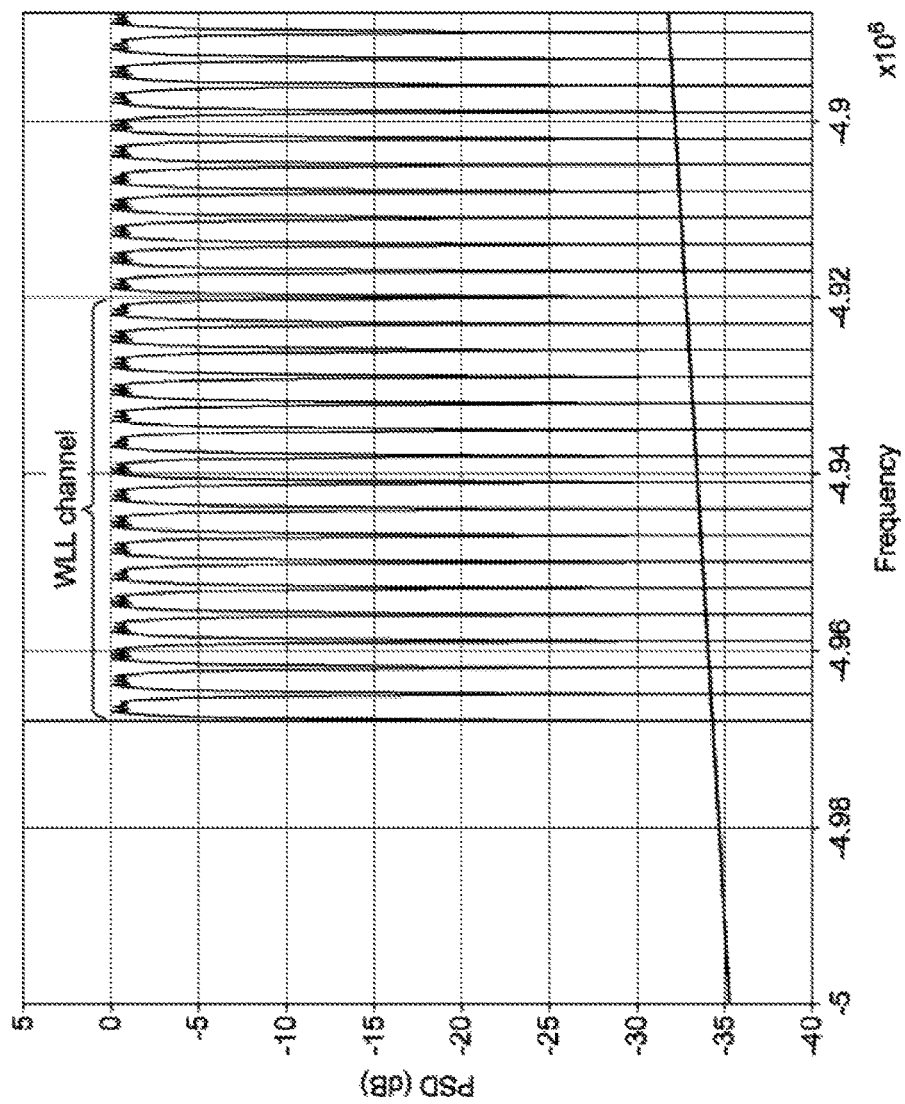
FIG. 8 shows uplink WLL sub-channels.

Each uplink WLL channel may be further sub-divided into 16 sub-channels, each being 3 kHz wide, as illustrated in FIG. 7. This allows multiple terminals to transmit simultaneously, without collision, using frequency division multiple access (FDMA). The result is an improvement in overall uplink capacity when many terminals in a cell would otherwise require processing gain if operating in the full WLL channel bandwidth. As described later, sub-channel bonding is supported to allow higher data rates from a terminal than is possible with a single sub-channel.

Each uplink sub-channel is individually pulse-shaped so that it is completely separable in frequency, rather than relying on orthogonality properties as would be the case in an OFDMA system or quasi-orthogonality properties of a GFDM system. Specifically, this means that the sub-channels can be separated at the base station by filtering techniques, with low susceptibility to frequency errors and mismatched power levels. This resilience is helpful in IoT systems for which traffic from terminals can be very infrequent so there is limited scope for closed loop control of frequency offsets or power levels. Some gross power control would then only be that needed to limit the required dynamic range through the base station receive chain.

Similarly, the proposed approach is preferred compared with code division multiple access (CDMA) because it avoids the need for fast or accurate power control.

Individual sub-carrier pulse-shaping also removes restrictions on the type of modulation that can be used within each sub-channel, subject to the modulation adhering to a spectral mask to constraint inter-user interference. In particular, it supports the use of constant envelope modulation schemes for improved terminal PA efficiency. GMSK is a good modulation option to allow the terminal power amplifier to operate at high efficiency, but BPSK, QPSK and 16 QAM options are available for terminal types where power consumption is a lower priority than data rate.

Figure 9:
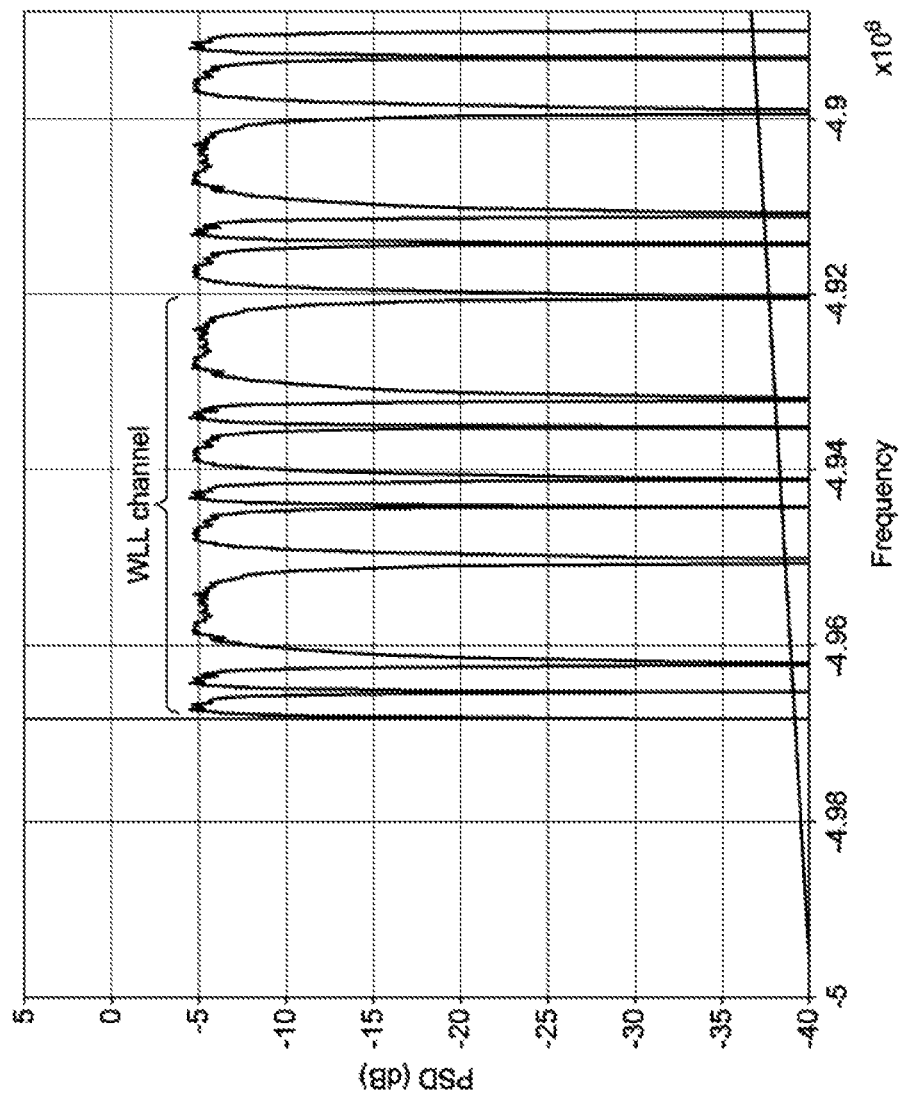
FIG. 9 shows uplink WLL sub-channels with bonding.

The base station may allocate a terminal a set of contiguous sub-channels for its uplink transmission in order to support higher uplink data rates through sub-channel bonding. For simplicity, the number of bonded sub-channels is constrained to be a power-of-two (i.e. 2, 4, 8 or 16, with the maximum bandwidth allocation being the full uplink WLL channel). A bonded sub-channel is pulse-shaped as a single carrier, albeit with a higher bandwidth, so retains the previously described benefits. This is illustrated in FIG. 9.

Splitting the WLL uplink into multiple sub-channels allows multiple terminals to transmit simultaneously, which is good for overall uplink capacity. However, this can lead to increased interference for the LTE receiver in the base station. The worst case would be 16 WLL terminals close to the base station, all transmitting at full power, with an LTE terminal also transmitting but from the cell edge. The interference from the WLL system is obviously multiplied-up by the number of terminals, in other words there is a power aggregation problem. A standard approach would be use power control to turn down the power from terminals close to the base station but this may not be ideal due to infrequent transmissions from terminals and the possibility that they are moving. If the power is turned down too much then the terminal will lose the connection to the base station. An alternative approach is for the base station to schedule terminals in such a way that it minimises the likelihood of the pathological situation of having many terminals transmitting simultaneously that are close to the base station. It would do this, on a best efforts basis, based on the received strength of previous transmissions from each terminal. The system would not rely on this scheduling to function correctly, but statistically it will reduce the interference seen by the LTE receiver until almost all circumstances.

Modulation Schemes

Downlink

Single carrier modulation is used within each 48 kHz WLL downlink channel. The following downlink modulation schemes are supported:
16-QAM
QPSK
BPSK It would be feasible to include 64-QAM to increase the maximum downlink data rate; however, this would place some further implementation constraints on the terminal receiver in terms of phase noise and data convertor accuracy.

Root-raised cosine pulse shaping is applied for all modulation modes, using a beta of 0.4.

The symbol rate is set to 32 kHz in order to fit the overall modulation into the 48 kHz WLL channel, allowing for the RRC pulse shaping and some margin for spectral re-growth.

Spreading codes are used to provide processing gain when communicating with terminals at high range. These codes maintain an approximately flat power spectral density and allow coherent integration at the terminal receiver. For example, broadcast control channels in larger cells are likely to use spreading codes in order to ensure reliable communication with cell edge terminals. Spreading factors in powers of two up to 32 are supported; the higher spreading factors would typically only be used for large cells or if the base station transmit power is constrained substantially.

Some examples of downlink data rates per WLL channel are shown in table 1, assuming a 10 MHz LTE channel. The aggregate downlink data rates for an entire LTE channel (12 WLL channels) are also shown, assuming all WLL channels are using the same modulation rate for the purposes of this illustration.

A short cyclic pre-/post-fix is added to blocks of symbols so that block-based frequency domain equalisation can be performed to enable robustness to large multipath delay spreads. The cyclic pre/postfix can be ignored by terminals that are able to assume a maximum multipath delay spread that is very low compared with the symbol period of 31.25 µs. In this case the equalisation is straightforward, because the WLL channels are only subject to flat fading.

Uplink

Single carrier modulation is used within each WLL uplink sub-channel. In the case of bonded sub-channels, single carrier modulation is still used but with a correspondingly higher modulation bandwidth. The following uplink modulation schemes are supported:
GMSK, with differential pre-coding
16-QAM
$\pi/4$ rotated QPSK, including differential option
$\pi/2$ rotated BPSK, including differential option For the GMSK mode, the Gaussian shaping filter has a BT factor of 0.3. The symbol rate is set to 1 kHz for the minimum sub-channel bandwidth of 3 kHz, which allows for the GMSK spectral side-lobes, and is scaled in proportion for bonded sub-channels. The base station receiver can adopt coherent or non-coherent decoding, depending on whether there is significant Doppler or other sources of phase drift.

For the 16-QAM, QPSK and BPSK modulation modes, root-raised cosine pulse shaping is applied using a beta of 0.4. The symbol rate is set to 2 kHz for the minimum sub-channel bandwidth of 3 kHz, and is scaled in proportion for bonded sub-channels.

Differential encoding may be used for BPSK and QPSK, under the control of the base station, in order to provide more resilience to Doppler and other sources of phase drift, albeit at the expense of ~2 dB loss in underlying receive sensitivity.

The $\pi/4$ rotation applied to QPSK and the $\pi/2$ rotation applied to BPSK reduces the peak-to-average power ratio (PAPR) of the modulation schemes, which improves transmit efficiency when using these modes for no significant cost at the terminal receiver.

For all modulation modes, spreading codes may be used to provide additional processing gain and so improve link budget. Spreading factors in powers of two up to 8 are supported. Spreading is only used with the minimum sub-channel bandwidth.

The GMSK mode has lower bandwidth efficiency than the 16 QAM/QPSK/BPSK modes, but offers much improved power amplifier efficiency without resorting to complex implementations. It is likely that many low cost, long battery life terminals will opt to use the GMSK uplink mode. One option would be to make GMSK support mandatory whilst leaving QAM/PSK modes optional, to be used by terminals that require higher data rates.

Some examples of uplink data rates per terminal are shown in table 2 for a 10 MHz LTE channel. The aggregate uplink data rates for an entire LTE channel (12 WLL channels, 16 sub-channels) are also shown, assuming all terminals use the same modulation rate for the purposes of this illustration.

As for the downlink, time domain equalisation for each WLL uplink channel is simple providing the maximum multipath delay spread is low compared with the symbol period of 31.25 μs (for the worst case of a single, fully-bonded sub-channel). In order to maximise capacity, no cyclic pre/postfix is inserted, and so it is assumed that the base station can equalise any significant ISI with time domain techniques.

Diversity

Individual WLL downlink and uplink channels are sufficiently narrow in bandwidth that they will be subject to flat fading. This could substantially degrade performance; for example a fixed terminal could be permanently in a deep fade. Therefore, either antenna diversity, or some additional mechanisms to provide frequency diversity, is required.

In order to minimise terminal cost and form factor, a terminal does not have to use more than one antenna. A terminal that chooses to use multiple antennas, however, can improve downlink performance through techniques such as maximum ratio combining.

Base stations will typically have two or more antennas per sector. These will be used in two ways:
1. To improve uplink performance through the use of maximum ratio combining (or similar), potentially combined with interference cancellation techniques
2. To improve downlink performance using open-loop transmit diversity, through space-time coding (e.g. the Alamouti code). Closed-loop techniques such as beamforming may be impractical in an IoT system due to the lack of a low latency feedback path for channel information.

There may be cases where it is not practical for the base station to support multiple antennas or where open-loop transmit diversity gives insufficient performance gain on the downlink. In these cases, the base station allocates pairs of WLL downlink channels, one channel being in the lower guard band and the other paired channel being in the upper guard band. This is similar to the generalised frequency diversity technique described above with respect to a Cellular IoT system. The frequency separation is sufficient to provide frequency diversity. The spaced channels could be used by the base station to transmit data to one or more terminals, or could be allocated by the base station to transmissions by one or more of the terminals. There are various possibilities for how the channel pairs could be utilised. For example:
1. The base station successively transmits the same downlink information on each of the pair of WLL channels. The terminal receiver tries receiving the first transmission, and if that fails (e.g. if it encounters a CRC error) it tries receiving the second transmission (there is usually no point receiving both transmissions if the first reception worked, as it just wastes power).
2. An extension of (1) is that if the first transmission fails, the terminal receiver may combine soft information from the first reception attempt with the second attempt, to improve the probability of a correct overall reception (e.g. by using chase combining)
3. The base station and the terminal may negotiate which of the pair of WLL channels is better for the terminal based on signal quality measurements from previous transmissions so that only a single transmission is required. This method avoids redundancy and hence wasted capacity, but the decision may need to be updated regularly, especially if the terminal is moving.
4. Any of the techniques described above with respect to diversity in a Cellular IoT system.

The above concepts are also applicable for the uplink, with the roles of base station and terminal reversed.

Link Budget Analysis

Table 3 shows the underlying assumptions used for the link budget analysis. Tables 4 and 5 show the link budget calculations for a selection of downlink and uplink WLL modulation rates. The maximum tolerable path loss is shown in the last row of each table.

The assumed conducted transmit powers and antenna gain have been selected as reasonable values from an implementation perspective. The transmit power is per WLL channel for the downlink, and per WLL sub-channel for the uplink.

In practice, the allowed transmit power from the base station and the terminal may have to be reduced due to potential interference issues with the LTE system. The analysis also depends on whether the WLL base station is co-located with the LTE base station, such that the path losses for each signal to a terminal are equal. The estimated maximum path loss values shown in the tables can be easily adjusted for different transmit power or antenna gain assumptions.

In the idealised case of an AWGN channel, receive diversity gain would provide a further 3 dB benefit for the uplink assuming two receive antennas at the base station.

Performance in the presence of Doppler is closely linked with the data rate that has been selected for a given terminal. Low data rates imply long symbol durations and this places a constraint on the rate at which the channel can be tracked. The limiting factor tends to be the uplink because the data rate on the uplink is often lower than on the downlink due to the asymmetry in conducted transmit power between base station and terminal. To avoid the need for accurate channel tracking, the base station can select differential PSK modulation for the uplink or use non-coherent GMSK reception. This trades resilience to Doppler against a reduction in underlying AWGN sensitivity for the particular modulation scheme.

Aggregate Cell Data Rate and Cell Capacity

Figure 10:
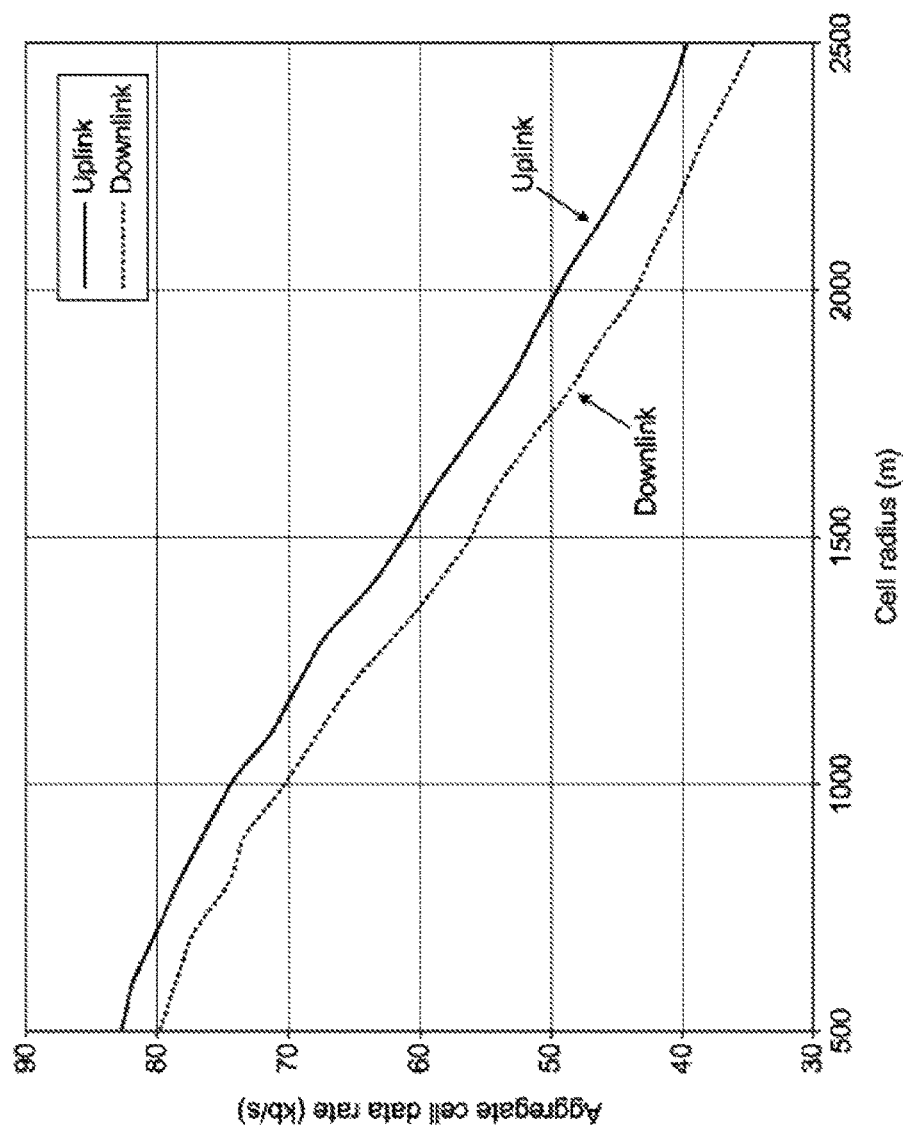
FIG. 10 shows aggregate data rates for a single WLL channel.

The aggregate cell data rate for the downlink and uplink using a single WLL channel is shown in FIG. 10. The aggregate data rate is defined as the expected average PHY data rate of all successful transmissions, averaged over a large number of frames.

The Okumura-Hata path loss model was used to model the large scale channel fading and a log-normal random variable with standard deviation of 8 dB was applied to represent the multipath channel and additional shadowing. The base station is assumed to have two antennas and uses interference cancellation. The downlink uses transmit diversity. The wall penetration loss seen by all terminals in the cell is 25 dB.

This analysis can be readily repeated for different underlying assumptions or channel models, as required.

Figure 11:
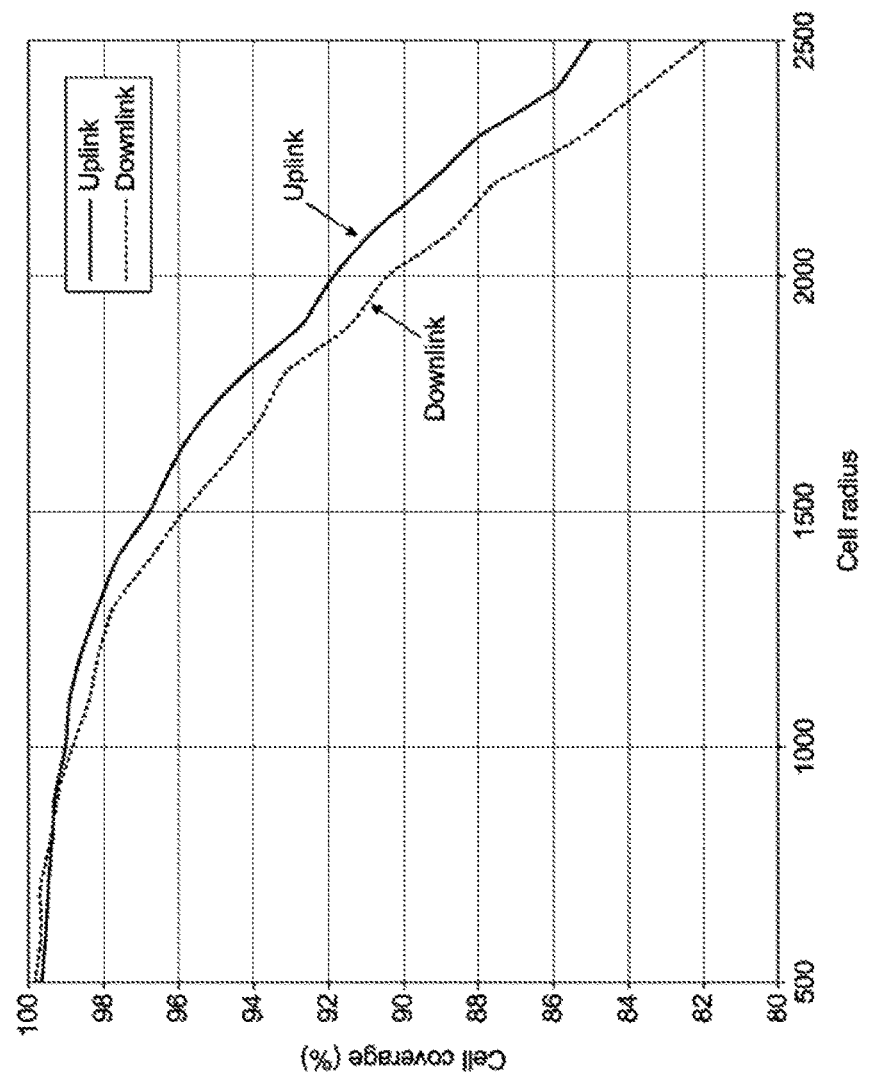
FIG. 11 shows cell coverage versus radius.

The cell coverage is shown in FIG. 11. Cell coverage is defined as the percentage of observed SINK values that allow a successful transmission.

MAC Frame Structure and Burst Formats

The proposed MAC follows the Weightless standard, with some adaptations to support FDD operation. The transport channels, logical channels, frame format, burst formats, re-transmission schemes, etc, are defined in detail in this Weightless specification, and the following is only intended as a brief overview of some of the key characteristics.

The following Logical Channels are provided by the Lower Link Layer of the MAC:
- Unicast Acknowledged Data
- Unicast Unacknowledged Data
- Unicast Acknowledged Control
- Multicast Acknowledged Data
- Multicast Unacknowledged Data
- Interrupt Acknowledged Data
- Interrupt Unacknowledged Data
- Broadcast Unacknowledged Data
- Register Unacknowledged Control These logical channels are designed to support the diverse range of traffic types that are needed for IoT systems. For example, short event driven uplink data might use the Interrupt Acknowledged Data channel, while large firmware downloads to many terminals would use the Multicast Acknowledged Data channel.

The MAC frame period is 2 seconds, which provides a compromise between the minimum achievable latency and the amount of data that can be communicated within a single frame at the minimum terminal data rate. Note that in many low power IoT applications, the latency is dominated by the impact of sleep modes rather than the MAC frame duration.

The choice of a 2 second MAC frame period is not a fundamental choice, and the system would easily scale to an alternative choice (e.g. 1 second, 1.5 seconds, or any duration between 1 and 2 seconds) subject to a different trade-off between latency and efficiency.

Figure 12:
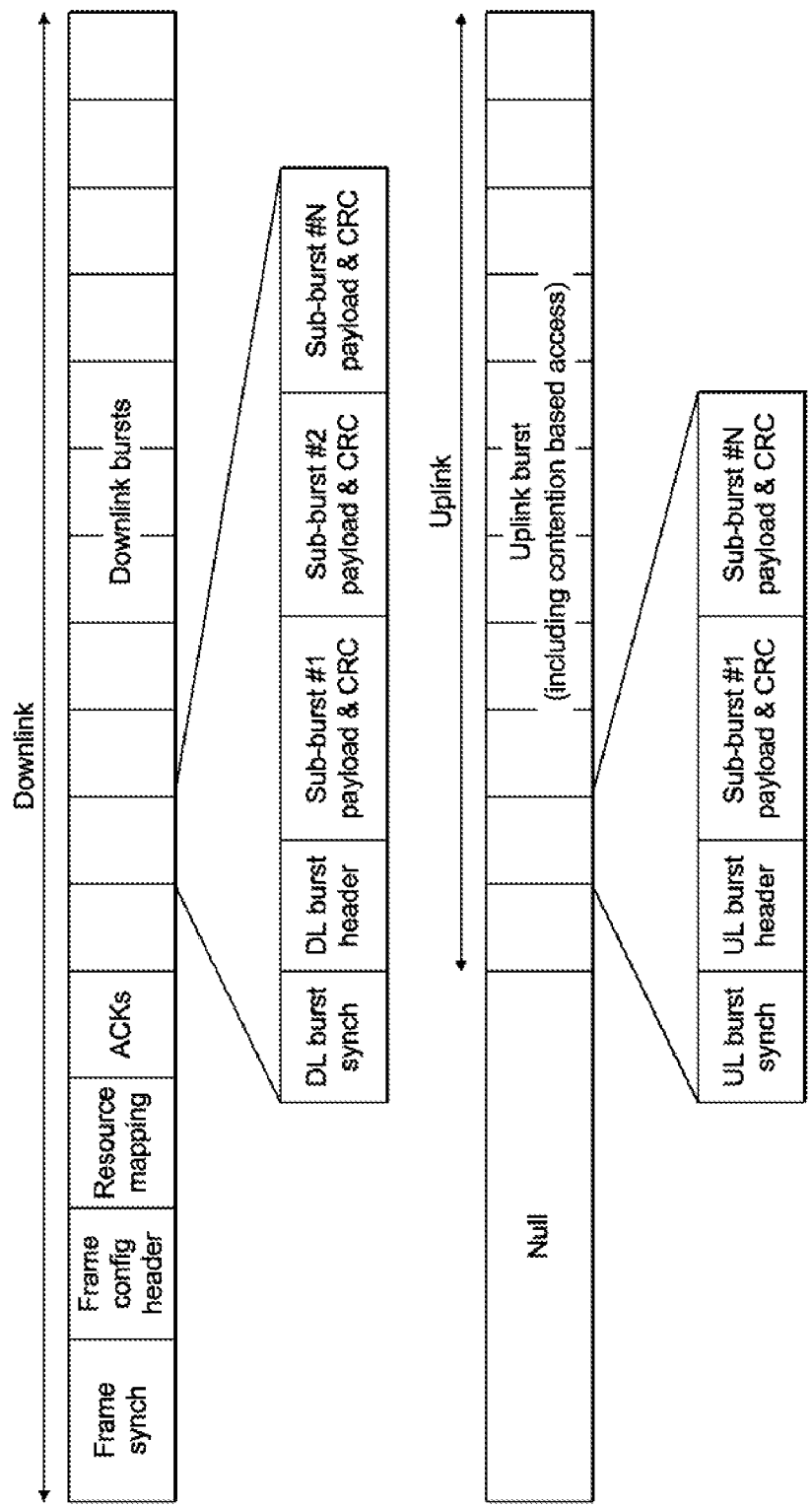
FIG. 12 shows a MAC frame structure.

The structure of the MAC frame for the downlink and uplink is illustrated in FIG. 12.

The fields for the downlink MAC frame are as follows:

| Field | | Description |
| --- | --- | --- |
| DL_FSYNC | Frame synchronisation sequence | Used for network detection and coarse frequency error estimation |
| DL_FCH | Frame configuration header | Used for broadcast control channel |
| RS_MAP | Resource mapping | Used for allocating downlink and uplink resource to specified terminals, and for allocating contention based uplink resource |
| DL_ACK | Acknowledgement flags | Acknowledgement information associated with uplink slots in previous frame |
| DL_ALLOC | Downlink allocated resource | Resource allocations to terminals |

The fields for the uplink MAC frame are as follows:

| Field | | Description |
| --- | --- | --- |
| UL_NULL | Unused | Unused uplink resource due to half-duplex FDD operation for terminals |
| UL_ALLOC | Uplink allocated resource | Resource allocations to terminals and for contention based access |

The downlink RS_MAP field contains the resource allocations for each terminal that is serviced in this frame, for both the downlink and uplink. For the downlink, this corresponds to time slot allocations, whereas for the uplink it corresponds to both time slot and sub-channel allocations.

In addition, the RS_MAP defines the modulation rate (modulation mode, spreading factor and FEC rate) for each resource allocation, and, for the case of uplink allocations, it defines the maximum allowed terminal transmit power. Selection of the modulation rate for each terminal is therefore under the control of the base station, and the base station may adapt this according to the link performance with that terminal.

The acknowledgement and re-transmission schemes allows the modulation rate to be changed for re-transmissions which avoids bursts having to be flushed after a potentially long delay if the link cannot support the modulation rate that was originally selected. Uplink bursts contain link quality information corresponding to the downlink which allows the base station to adapt the downlink modulation rate, if appropriate.

The RS_MAP also specifies which uplink resource is available for contention based access. Contention based access is used by the Register Control channel and the Interrupt Data channel. The contention based bursts are kept to a minimal length, to reduce the probability of collision, and can be regarded as a request for scheduled resource in upcoming MAC frames.

In order to minimise terminal power consumption, terminals can negotiate with the base station to receive only a small fraction of downlink frames, termed rendezvous frames. Therefore, downlink traffic from the base station to the terminal is only scheduled for these frames. The terminal may choose to send uplink traffic either on the rendezvous frames or through contention based access on any frame.

Beacon frames are used by the base station for the Broadcast Control channel, in order to manage the cell. Terminals are required to receive the beacon frames, which typically occur every 512 frames (depending on the network configuration) and are repeated to improve reliability of reception. The beacon frames may also be used by the base station to instruct specific terminals to receive downlink data on subsequent defined frames rather than waiting for the next rendezvous frame.

The burst formats for downlink and uplink are illustrated in FIG. 12. A burst synchronisation sequence allows burst detection, fine timing estimation, fine frequency error estimation and channel estimation. The burst header describes the logical channel for the burst, the burst length, sequence numbers (for the current burst and for the next expected sequence number in the reverse direction), and other control/configuration information. The uplink burst header also includes link quality information for the downlink. The burst payload is segmented into multiple sub-bursts, where each sub-burst has a 24 bit CRC for error detection. This allows finer grained selective re-transmission. A typical maximum sub-burst length is 256 bytes, so shorter bursts contain only a single sub-burst.

Interleaving, Error Correction and Error Detection

The downlink and uplink transmissions may apply CRCs for error detection, followed by FEC, and block based interleaving.

The FEC options are:

Rate ½ convolution coding

Rate ¾ convolution coding, based on puncturing the rate ½ scheme

Convolutional coding is used because it generalises to very short bursts without imposing excessive overhead (i.e. it only requires a small number of termination symbols). Alternative FEC schemes such as turbo codes and LDPC would achieve greater coding gain for longer bursts, but this is at the expense of imposing a minimum burst length (or a loss in performance) and greater complexity.

It would be possible to add either LDPC or turbo coding as alternative, but optional, FEC schemes if this was considered to be desirable to improve performance with much longer IoT messages. The broadcast control channel would continue to use the baseline convolutional coding scheme for compatibility with all terminals.

Each sub-burst is protected by a 24 bit CRC, except for certain contention based access requests that are protected with a 16 bit CRC to minimise their duration and so reduce the probability of collision.

Block based interleaving is used to provide time diversity. The block length is scaled according to the spreading factor and, for the case of the uplink, the number of bonded sub-channels, so that it represents an approximately constant time period.

Acknowledgements and Re-Transmissions

Two acknowledgement and re-transmission schemes are defined:

A baseline scheme for downlink data and for long uplink messages

An optimised scheme for short uplink messages

The baseline scheme uses selective re-transmission, with 8 bit sequence numbers in order to allow data to continue to be transmitted without needing to wait for the acknowledgements or re-transmission requests to be received. This is needed to support higher data rates given the long MAC frame duration.

The optimised scheme for short uplink messages uses stop-and-wait, with a 1 bit sequence number. The acknowledgement information is compact (single bit) so is returned in the ACK field of the subsequent frame. This scheme is constrained in that only a single burst, containing a single sub-burst, can be transmitted from a given terminal in each frame. Although the length of a sub-burst is variable, a typical maximum length would be 256 bytes and so this is the limit in the amount of data that can be sent in one frame, on a given Logical Channel, when using this scheme.

Both schemes allow re-fragmentation of the transmitted data when it is re-transmitted. This is important for two reasons;

It allows flexibility in the amount of resource that is scheduled by the base station to a given terminal, rather than forcing the base station to maintain the same resource allocation in case of re-transmissions. Scheduling large numbers of terminals in a cell is a complicated problem, hence it is preferable to minimise constraints on resource allocations It allows the base station to change the modulation mode of a terminal to a lower modulation order, reduced number of bonded sub-channels (for the uplink), or higher spreading factor, following a number of unsuccessful re-transmission attempts. This is helpful given that many IoT applications require infrequent transmissions and therefore historical link quality information can become invalid between transmissions.

A drawback of allowing re-fragmentation is that there will be instances when hybrid-ARQ with chase combining becomes complicated. Simpler terminals would typically not attempt chase combining.

TABLE 1

Downlink data rates per WLL channel for a 10 MHz LTE channel

| Modulation rate | Spreading factor | FEC rate | PHY downlink data rate per WLL channel | Aggregate downlink PHY data rate per LTE channel |
|---|---|---|---|---|
| 16 QAM | 1 | ¾ | 96 kbps | 1152 kbps |
| QPSK | 1 | ½ | 32 kbps | 384 kbps |
| BPSK | 1 | ½ | 16 kbps | 192 kbps |
| BPSK | 2 | ½ | 8 kbps | 96 kbps |
| BPSK | 8 | ½ | 2 kbps | 24 kbps |
| BPSK | 16 | ½ | 1 kbps | 12 kbps |

TABLE 2

Uplink data rates per terminal for a 10 MHz LTE channel

| Modulation rate | Bonded sub-channels | Spreading factor | FEC rate | Uplink PHY data rate per terminal | Aggregate uplink PHY data rate per LTE channel |
|---|---|---|---|---|---|
| 16 QAM | 16 | 1 | ¾ | 96 kbps | 1152 kbps |
| 16 QAM | 4 | 1 | ¾ | 24 kbps | 1152 kbps |
| 16 QAM | 1 | 1 | ¾ | 6 kbps | 1152 kbps |
| QPSK | 1 | 1 | ½ | 2 kbps | 384 kbps |
| BPSK | 1 | 1 | ½ | 1 kbps | 192 kbps |
| BPSK | 1 | 8 | ½ | 125 bps | 24 kbps |
| GMSK | 16 | 1 | ¾ | 12 kbps | 144 kbps |
| GMSK | 4 | 1 | ½ | 2 kbps | 96 kbps |
| GMSK | 2 | 1 | ½ | 1 kbps | 96 kbps |
| GMSK | 1 | 1 | ½ | 500 bps | 96 kbps |
| GMSK | 1 | 2 | ½ | 250 bps | 48 kbps |
| GMSK | 1 | 4 | ½ | 125 bps | 24 kbps |

TABLE 3

Link budget assumptions

| | Base station | Terminal |
|---|---|---|
| Antenna gain (dBi) | +14 | −4 |
| Conducted Tx power (dBm) | 30 | 20 |
| Rx noise figure (dB) | 4 | 5 |

TABLE 4

Link budget for downlink WLL

| | Downlink | | | |
|---|---|---|---|---|
| | 16-QAM | QPSK | BPSK | BPSK |
| PHY data rate (kbps) | 96.0 | 32.0 | 16.0 | 2.0 |
| Spectral efficiency | 4 | 2 | 1 | 1 |
| FEC | 3/4 | 1/2 | 1/2 | 1/2 |
| Spreading factor | 1 | 1 | 1 | 8 |
| Bandwidth (kHz) | 32.0 | 32.0 | 32.0 | 32.0 |
| EIRP (dBm) | 40.0 | 40.0 | 40.0 | 40.0 |
| Required SNR (dB) | 14.5 | 4.0 | 1.0 | −8.0 |
| Noise figure (dB) | 5.0 | 5.0 | 5.0 | 5.0 |
| Noise power (dBm) | −123.9 | −123.9 | −123.9 | −123.9 |
| Rx sensitivity | −109.4 | −119.9 | −122.9 | −132.0 |
| Maximum path loss | 149.4 | 159.9 | 162.9 | 172.0 |

TABLE 5

Link budget for uplink WLL

| | Uplink | | | | | |
|---|---|---|---|---|---|---|
| | 16-QAM | QPSK | BPSK | GMSK | GMSK | GMSK |
| PHY data rate (kbps) | 96.0 | 2.0 | 0.1 | 12.0 | 2.0 | 0.1 |
| Spectral efficiency | 4 | 2 | 1 | 1 | 1 | 1 |
| FEC | 3/4 | 1/2 | 1/2 | 3/4 | 1/2 | 1/2 |
| Spreading factor | 1 | 1 | 8 | 1 | 1 | 4 |
| Bonded sub-channels | 16 | 1 | 1 | 16 | 4 | 1 |
| Bandwidth (kHz) | 32.0 | 2.0 | 2.0 | 16.0 | 4.0 | 1.0 |
| EIRP (dBm) | 20.0 | 20.0 | 20.0 | 20.0 | 20.0 | 20.0 |
| Required SNR (dB) | 14.5 | 4.0 | −8.0 | 7.0 | 5.0 | −1.0 |
| Noise figure (dB) | 4.0 | 4.0 | 4.0 | 4.0 | 4.0 | 4.0 |
| Noise power (dBm) | −124.9 | −137.0 | −137.0 | −128.0 | −134.0 | −140.0 |
| Rx sensitivity | −110.4 | −133.0 | −145.0 | −121.0 | −129.0 | −141.0 |
| Maximum path loss | 140.4 | 163.0 | 175.0 | 151.0 | 159.0 | 171.0 |

Figure 13:
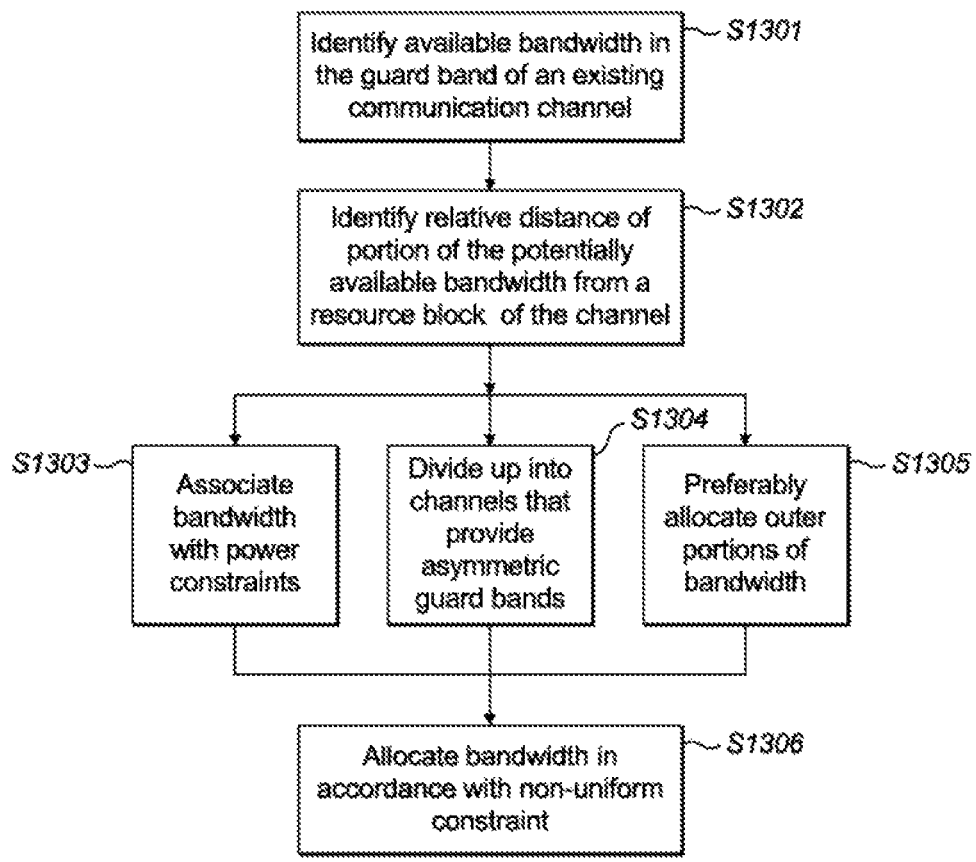
FIG. 13 shows an example of a method for allocating communication bandwidth.

An example of a method as described herein is shown in FIG. 13. The method comprises identifying bandwidth that is allocated to the guard band of a communication channel according to one protocol (S1301). This bandwidth is then allocated to a communication according to another protocol, but the allocation is performed non-uniformly. This comprises identifying a relative distance of portions of the available bandwidth from the resource block of the host system (S1302) and then performing one or more: (i) associating a power constraint with particular portions of bandwidth in dependence on their relative distance from the resource block (S1303); (ii) dividing up the available bandwidth into channels in such a way as to provide asymmetric guard bands that are weighted to the innermost guard band (S1304); and (iii) preferentially allocating the outermost channels so that the innermost channels are only allocated once the outermost channels have been exhausted (S1305). The bandwidth is then allocated in accordance with one or more of the non-uniform constraints (S1306).

Figure 14:
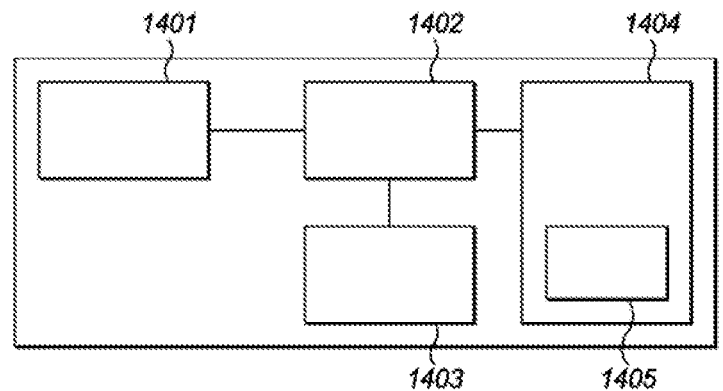
FIG. 14 shows an example of a controller for allocating communication bandwidth.

An example of the functional units that may be comprised in a controller for allocating bandwidth is shown in FIG. 14. It comprises an identification unit 1401 configured to identify appropriate portions of bandwidth that may be used by an IoT hosted network, an allocation unit 1402 configured to allocate channels to a communication device in the hosted network (e.g. base stations and terminals) and a scheduler 1403 configured to allocate time slots to particular communications. The controller also comprises a constraint unit 1404 configured to determine what, if any, constraints should be applied to particular allocations of bandwidth in order to minimise interference caused to the host network. In this example the constraint unit comprises a power controller 1405 configured to determine appropriate transmit powers for particular portions of bandwidth. The controller may be implemented in a core network or in a communication device such as a base station. Some functions of the controller may be split across the core network and the base station, e.g. the identification unit and the allocation unit may be implemented in the core network while the scheduler is implemented in the base stations.

Figure 15:
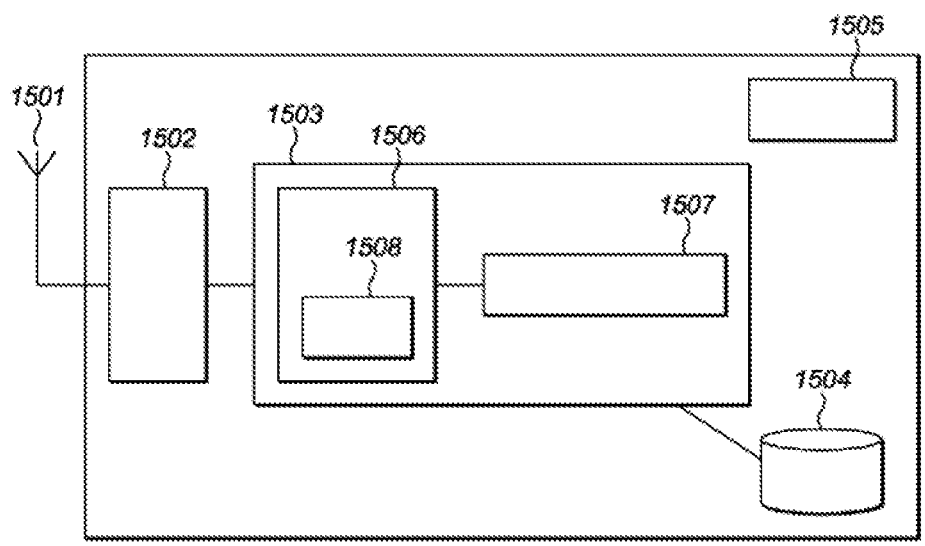
FIG. 15 shows an example of a communication device.

An example of a communication device or apparatus is shown in FIG. 15. The communication device may perform any role in the network. For example, the communication device may be a base station or a communication terminal. The communication device may be configured to act in combination with other devices in the network, either through some form of explicit coordination with other devices and/or through following the protocol and/or instructions from the network, to produce a combined effect that minimises interference to a host. "Examples of such combined effects might include a combined power spectrum which combined effect that is to be expected in the mirror host or a transmit power across the host bandwidth is non-uniformly distributed."

The communication device in this example is configured for wireless communication: it comprises an antenna 1501, an RF front end 1502 and a baseband processing unit 1503, all of which are configured for transmitting and receiving data. The communication device further comprises a memory 1504 and a battery 1505. The baseband processing unit incorporates a number of functional modes including a controller 1506 and a frequency diversity module 1507. The controller may be generally configured to ensure that any constrains applicable to communications by the communication device are complied with. In this example, the controller includes a specific power control unit 1508.

The structures shown in FIGS. 14 and 15 are intended to correspond to a number of functional blocks in an apparatus. This is for illustrative purposes only. FIGS. 14 and 15 are not intended to define a strict division between different parts of hardware on a chip or between different programs, procedures or functions in software. In some embodiments, some or all of the procedures described herein may be performed wholly or partly in hardware. In some implementations, functional blocks such as the allocation unit, scheduler, controller, and frequency diversity module may be implemented by a processor acting under software control. Any such software is preferably stored on a non-transient computer readable medium, such as a memory (RAM, cache, FLASH, ROM, hard disk etc.) or other storage means (USB stick, FLASH, ROM, CD, disk etc).

Figure 16:
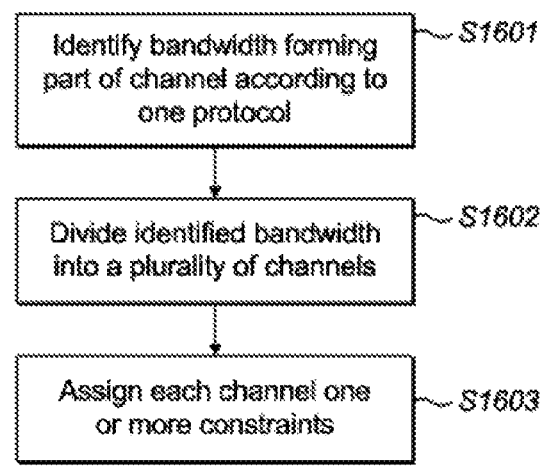
FIG. 16 shows an example of dividing host bandwidth into a number of channels.

An overview of a method for allocating bandwidth to a hosted network is shown in FIG. 16. The method includes identifying bandwidth that forms part of a channel for communication according to one communication protocol (step S1601). That bandwidth is then divided into a plurality of channels for use by another communication protocol (step S1602). Each channel may then be assigned one or more constraints (step S1603). Those constraints are preferably applied non-uniformly across the identified bandwidth in dependence on the relative location of each allocated channel within the channel for communication according to the first of the communication protocols.

Figure 17:
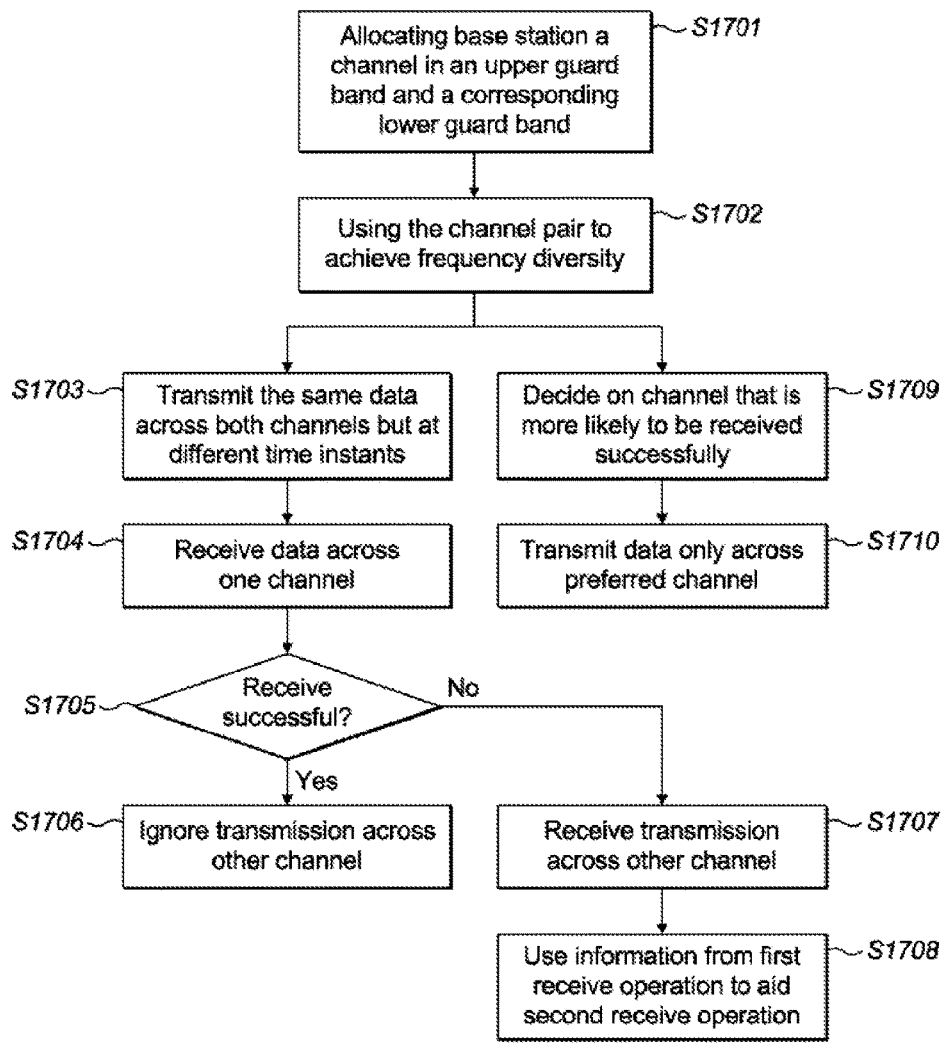
FIG. 17 shows an example of a method that makes use of frequency diversity.

Another example of a method described herein is shown in FIG. 17. The method comprises allocating a communication device a pair of channels that are spaced in frequency (S1601). In this example, the communication device is allocated one channel formed from bandwidth comprised in the lower guard band of an LTE channel and a corresponding channel formed from bandwidth comprised in the upper guard band of the channel. The pair of channels are then used for frequency diversity (S1702).

Frequency diversity may be achieved by the following options:
(i) Transmitting data to be communicated between the base station and the terminal across both channels but at different time instants (S1703). This has the advantage that the communication terminal needs only a single antenna to communicate both instances of the signal. The transmitting party may be either the base station or the terminal. The receiving party receives the first of the transmissions (S1704) and checks whether that receive operation was successful (S1705). If yes, the receiving party ignores the second transmission (S1706). If no, the receiving party receives the second transmission (S1707) and optionally uses information derived during the first receive operation to aid the second receive operation (S1708).
(ii) The advantages of frequency diversity may also be realised without the additional overhead of making two separate transmissions of the same data if the base station and/or terminal decide beforehand on the channel that is more likely to produce a successful transmission (S1709). In some embodiments this decision may be taken solely by the base station based on information it has gathered previously about the terminal, e.g. its location, the interference it is subject to, its previous performance on the first and second channels, whether it is mobile or static etc. The data may then be transmitted on only the preferred one of the channel pair (S1710).

The frequency diversity this method provides enables the communication terminal to derive a better quality version of the transmitted data than would otherwise be the case, particularly in situations where one of the base station's channels is subject to fading.

Figure 18:
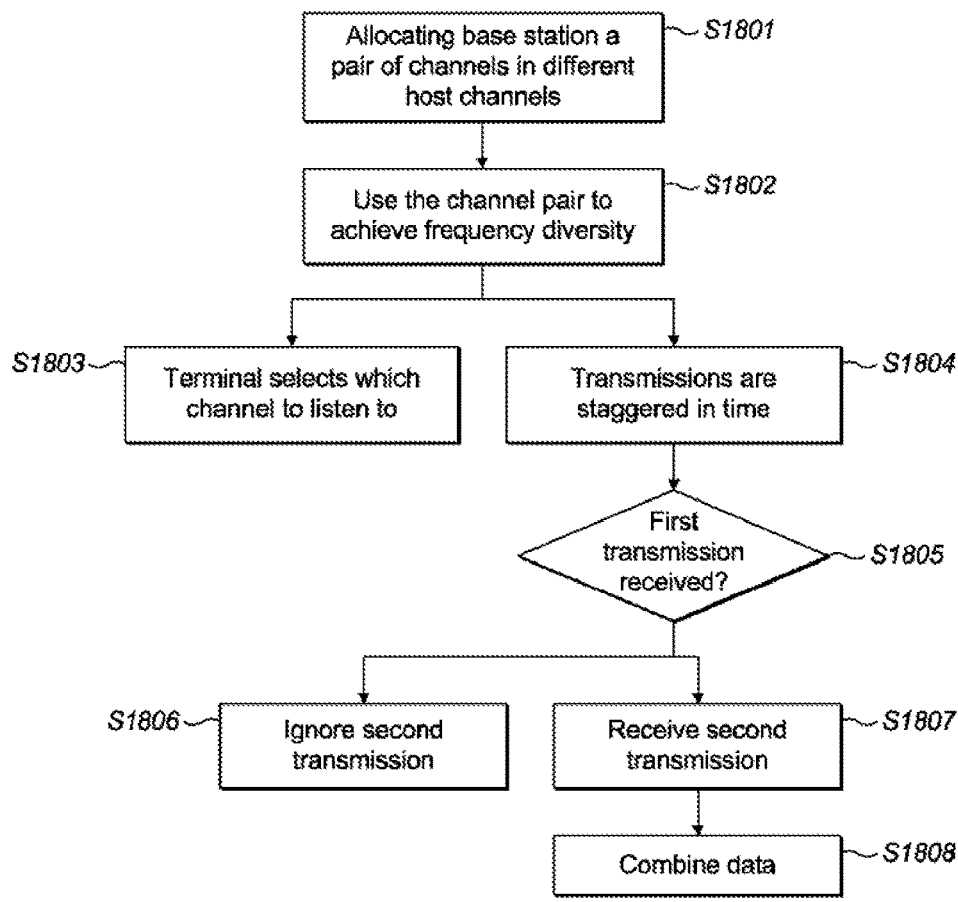
FIG. 18 shows an example of a method that makes use of frequency diversity.

Another example of a method described herein is shown in FIG. 18. This method also comprises allocating a communication device a pair of channels that are spaced in frequency (S1801). In this example, the communication device is allocated channels formed from bandwidth comprised in different host channels. The pair of channels are then used for frequency diversity (S1802).

In this example frequency diversity is achieved by the following options:
(i) The communication terminal selects which channel to listen to (step S1803). This selection may be based on the signal quality that the terminal is experiencing over both channels or on how successful previous receiver operations over those channels have been, for example. In one example, the communication terminal may only ever listen to one channel e.g. because data is transmitted at the same time across both.
(ii) The communications from the base station might be staggered by a length of time that is known to the terminal (step S1804). The communication terminal decides whether to listen to the later transmission depending on whether the first transmission is successfully received or not (step S1805). The communication terminal may ignore the second transmission if the first is received successfully (step S1806). If the first reception operation was not sufficiently successful, terminal may decide to receive the second transmission (step S1807) and optionally combine it with any data from the first reception operation (step S1808).

Figure 19:
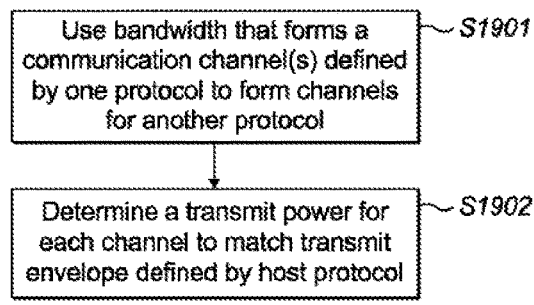
FIG. 19 shows an example of a method of applying a constraint to hosted channels.

FIG. 19 shows an overview of another method in which bandwidth that forms part of a communication channel in accordance with one communication protocol is used to form a plurality of channels in accordance with another communication protocol (step S1901). Those channels may have a different width from the host channel. A transmit power is then individually determined for each of said plurality of channels (step S1902). The transmit powers are selected so that a power envelope formed by transmitting data across the plurality of hosted channels substantially conforms to a power envelope that is acceptable for the host channel according to the first of the communication protocols.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

Further embodiments of the present disclosure are provided in the following. It should be noted that the numbering used in the following section does not necessarily need to comply with the numbering used in the previous sections.

Embodiment 1

A method for allocating bandwidth to communication according to a first communication protocol, the method comprising:
identifying bandwidth that is allocated to a communication channel for communication according to a second communication protocol and which forms a guard band of the communication channel; and
allocating the identified bandwidth to communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth.

Embodiment 2

A method as described in embodiment 1, comprising dividing the identified bandwidth into a plurality of channels and allocating each channel to a communication device configured to operate in accordance with the first communication protocol.

Embodiment 3

A method as described in embodiment 2, comprising preferentially allocating a first one of said plurality of channels over a second one of said plurality of channels, the second channel being located closer to the communication according to the second communication protocol than the first channel.

Embodiment 4

A method as described in embodiment 2 or 3, comprising associating a power constraint with each of the plurality of channels such that a first one of said plurality of channels is subject to a more restricted power constraint than a second one of said plurality of channels, the second channel being located closer to the communication according to the second communication protocol than the first channel.

Embodiment 5

A method as described in any of embodiments 2 to 4, comprising leaving an inner guard band between the plurality of channels and a communication according to the second communication channel and an outer guard band between the plurality of channels and the edge of the communication channel, said inner guard band being wider than said outer guard band.

Embodiment 6

A method as described in any of embodiments 2 to 5, comprising allocating a communication device an uplink channel and a downlink channel that can be used simultaneously.

Embodiment 7

A method as described in embodiment 6, comprising allocating the communication device an uplink channel that is formed of bandwidth comprised in the guard band of an uplink communication channel for communication according to the second communication protocol and a downlink channel that is formed of bandwidth comprised in the guard band of a downlink communication channel for communication according to the second communication protocol.

Embodiment 8

A method as described in embodiment 6 and 7, comprising scheduling communications with the communication device to occur on the uplink and downlink channel at the same time.

Embodiment 9

A method as described in any on embodiments 6 to 8, comprising scheduling communications between the communication device and a particular communication terminal with which the communication device is communicating to occur on only one of the uplink and the downlink channel at any one time.

Embodiment 10

A method as described in any of embodiments 6 to 9, comprising allocating the full width of a downlink channel to a downlink communication according to the first communication protocol.

Embodiment 11

A method as described in any of embodiments 6 to 10, comprising dividing the uplink channel into a plurality of sub-channels such that each sub-channel can be allocated to a different uplink communication according to the first communication protocol.

Embodiment 12

A method as described in embodiment 11, comprising individually pulse shaping each communication on an uplink sub-channel.

Embodiment 13

A method as described in embodiment 11 or 12, comprising allocating a communication terminal a plurality of contiguous sub-channels for a single uplink communication.

Embodiment 14

A method as described in embodiment 13, comprising pulse shaping the single uplink communication onto a single carrier.

Embodiment 15

A method as described in any of embodiments 11 to 14, comprising scheduling communications on the plurality of sub-channels in dependence on a power with which one or more communication terminals have previously communicated with the communication device so as to avoid a combined receive power at the communication device across the plurality of sub-channels exceeding a predetermined threshold at any one time.

Embodiment 16

A controller for allocating bandwidth to communication according to a first communication protocol, the controller being configured to:
identify bandwidth that is allocated to a communication channel for communication according to a second communication protocol and which forms a guard band of the communication channel; and
allocate the identified bandwidth to communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth.

Embodiment 17

A method for allocating bandwidth to communications according to a first communication protocol that make use of frequency diversity, the method comprising:
identifying bandwidth that is allocated to a communication channel for communication according to a second communication protocol and which forms guard bands on either side of that communication channel; and
allocating a communication device configured to operate according to the first communication protocol a first channel formed from identified bandwidth that is comprised in one of the guard bands and a second channel formed from identified bandwidth that is comprised in another of the guard bands in order that the communication device may use the first and second channels for frequency diversity.

Embodiment 18

A method as described in embodiment 17, comprising transmitting the same data across the first and second channels.

Embodiment 19

A method as described in embodiment 18, comprising transmitting said data simultaneously across both channels.

Embodiment 20

A method as described in any of embodiments 17 to 19, comprising selecting which channel to use to receive data in dependence on a signal quality experienced across one or both of the first and second channels.

Embodiment 21

A method as described in any of embodiments 17 to 20, comprising selecting which channel to use to receive data in dependence on a signal quality experienced across one or both of the first and second channels during a previous receive operation.

Embodiment 22

A method as described in any of embodiments 17 to 21, comprising selecting which channel to use to receive data in dependence on a success associated with a previous receive operation across one or both of the first and second channels.

Embodiment 23

A method as described in embodiment 22, comprising:
if the preceding receive operation was successful, using the same channel to receive the data as was used during that preceding operation; and
if the preceding receive operation was not successful, using a different channel to receive the data than was used during that preceding operation.

Embodiment 24

A method as described in any of embodiments 18 to 23, comprising transmitting said data across the second channel after transmitting it across the first channel.

Embodiment 25

A method as described in embodiment 24, comprising delaying the transmission across the second channel by a length of time that is known to the intended recipient of said data.

Embodiment 26

A method as described in embodiment 25, comprising delaying the transmission across the second channel by a length of time that exceeds the maximum length of time taken to receive said data.

Embodiment 27

A method as described in any of embodiments 18 to 26, comprising receiving the data across both the first channel and the second channel.

Embodiment 28

A method as described in any of embodiments 18 to 27, comprising receiving the data across both the first channel and the second channel only if a receive operation across one or the first or second channels is deemed to have failed.

Embodiment 29

A method as described in any of embodiments 17 to 28, comprising deriving information from receiving data across one of the first and second channels and receiving data across the other of the first and second channels in dependence on that information.

Embodiment 30

A method as described in any of embodiments 18 to 29, comprising combining data received across the first and second channels.

Embodiment 31

A method as described in any of embodiments 17 to 30, comprising a communication device allocating a communication with a communication terminal to either the first channel or the second channel in dependence on which of the first and second channels is deemed more likely to result in the communication being successfully received.

Embodiment 32

A method as described in any of embodiments 17 to 31, comprising a communication device forwarding measurements of signal quality across the first and second channels to another communication device.

Embodiment 33

A method as described in any of embodiments 17 to 32, comprising allocating the first and second channels only to communication devices that are considered to be suffering from poor signal quality and allocating other communication devices just one channel.

Embodiment 34

A controller for allocating bandwidth to communications according to a first communication protocol that make use of frequency diversity, the controller being configured to:
identify bandwidth that is allocated to a communication channel for communication according to a second communication protocol and which forms guard bands on either side of that communication channel; and
allocate a communication device configured to operate according to the first communication protocol a first channel formed from identified bandwidth that is comprised in one of the guard bands and a second channel formed from identified bandwidth that is comprised in another of the guard bands in order that the communication device may use the first and second channels to achieve frequency diversity.

Embodiment 35

A communication device for communicating according to a first communication protocol, the communication device being configured to:
communicate over a first channel in accordance with the first communication protocol, said first channel comprising bandwidth comprised in a guard band on one side of a channel in accordance with a second communication protocol;
communicate over a second channel in accordance with the first communication protocol, said first channel comprising bandwidth comprised in a guard band on the other side of said channel in accordance with a second communication protocol; and
use the first and second channels to apply frequency diversity to communications in accordance with the first communications protocol.

Embodiment 36

A method for allocating bandwidth to communications according to a first communication protocol, the method comprising:
identifying, in a part of the spectrum that is divided into a plurality of channels for communication according to a second communication protocol, at least two of those channels that are: (i) separated from each other by at least one other channel for communication according to the second communication protocol; and (ii) available for communication according to the first communication protocol; and
allocating a communication device configured to operate according to the first communication protocol a first channel formed from bandwidth comprised in one of the two identified channels and a second channel formed from bandwidth comprised in the other of the two identified channels, in order that the communication device may use the first and second channels to apply frequency diversity to communications made in accordance with the first communications protocol.

Embodiment 37

A method as described in embodiment 36, comprising transmitting the same data across the first and second channels.

Embodiment 38

A method as described in embodiment 37, comprising transmitting said data simultaneously across both of the first and second channels.

Embodiment 39

A method as described in any of embodiments 36 to 38, comprising selecting which channel to use to receive data in dependence on a signal quality experienced across one or both of the first and second channels.

Embodiment 40

A method as described in any of embodiments 36 to 39, comprising selecting which channel to use to receive data in dependence on a signal quality experienced across one or both of the first and second channels during a previous receive operation.

Embodiment 41

A method as described in any of embodiments 36 to 40, comprising selecting which channel to use to receive data in dependence on a success associated with a previous receive operation across one or both of the first and second channels.

Embodiment 42

A method as described in embodiment 41, comprising:
if the preceding receive operation was successful, using the same channel to receive the data as was used during that preceding operation; and
if the preceding receive operation was not successful, using a different channel to receive the data than was used during that preceding operation.

Embodiment 43

A method as described in any of embodiments 36 to 42, comprising transmitting said data across the second channel after transmitting it across the first channel.

Embodiment 44

A method as described in embodiment 43, comprising delaying the transmission across the second channel by a length of time that is known to the intended recipient of said data.

Embodiment 45

A method as described in embodiment 44, comprising delaying the transmission across the second channel by a length of time that exceeds the maximum length of time that it will take to receive said data.

Embodiment 46

A method as described in any of embodiments 37 to 45, comprising receiving the data across both the first channel and the second channel.

Embodiment 47

A method as described in any of embodiments 37 to 46, comprising receiving the data across both the first channel and the second channel only if a receive operation across one of the first or second channels is deemed to have failed.

Embodiment 48

A method as described in any of embodiments 36 to 47, comprising deriving information from receiving data across one of the first and second channels and receiving data across the other of the first and second channels in dependence on that information.

Embodiment 49

A method as described in any of embodiments 37 to 48, comprising combining data received across the first and second channels.

Embodiment 50

A method as described in any of embodiments 36 to 49, comprising a communication device allocating a communication with a communication terminal to either the first channel or the second channel in dependence on which of the first and second channels is deemed more likely to result in the communication being successfully received.

Embodiment 51

A method as described in any of embodiments 36 to 50, comprising a communication device forwarding measurements of signal quality across the first and second channels to the communication device.

Embodiment 52

A method as described in any of embodiments 36 to 51, comprising allocating the first and second channels only to communication devices that are considered to be suffering from poor signal quality and allocating other communication devices just one channel.

Embodiment 53

A method as described in any of embodiments 36 to 52, comprising dividing at least one of the two identified channels into plurality of channels for communication according to the first communication protocol.

Embodiment 54

A method as described in embodiment 53, comprising allocating at least one of said plurality of channels to a different communication device from another of said plurality of channels.

Embodiment 55

A controller for allocating bandwidth to communications according to a first communication protocol, the controller being configured to:
identify, in a part of the spectrum that is divided into a plurality of channels for communication according to a second communication protocol, at least two of those channels that are: (i) separated from each other by at least one other channel for communication according to the second communication protocol; and (ii) available for communication according to the first communication protocol; and
allocate a communication device configured to operate according to the first communication protocol a first channel formed from bandwidth comprised in one of the two identified channels and a second channel formed from bandwidth comprised in the other of the two identified channels, in order that the communication device may use the first and second channels to apply frequency diversity to communications made in accordance with the first communications protocol.

Embodiment 56

A communication device for communicating according to a first communication protocol, the communication device being configured to:
communicate over a first channel in accordance with the first communication protocol;
communicate over a second channel in accordance with the first communication protocol;
said first and second channels being formed from bandwidth that is in a part of the spectrum that is divided into a plurality of channels for communication according to a second communication protocol, the first and second channels being formed from respective ones of those channels for communication according to the second communication protocol that are separated from each other by at least one other channel for communication according to the second communication protocol; and
use the first and second channels to apply frequency diversity to communications made in accordance with the first communications protocol.

Embodiment 57

A method for allocating bandwidth to communication according to a first communication protocol in such a way as to minimise interference to communication according to a second communication protocol, the method comprising:
allocating bandwidth to form a plurality of channels in accordance with the first communication protocol, said channels having a different width from channels that are defined by the second communication protocol; and
individually determining a transmit power for each of said plurality of channels such that a power envelope formed by transmitting data across said plurality of channels in accordance with the first communication protocol substantially conforms to a power envelope that the second communication protocol defines for transmitting data across the allocated bandwidth.

Embodiment 58

A method as described in embodiment 57, comprising individually determining the transmit power such that at least one of said plurality of channels is assigned a transmit power that is different from another of said plurality of channels.

Embodiment 59

A method as described in embodiment 57 or 58, comprising allocating the plurality of channels to communication terminals in dependence on one or more of: a location associated with the communication terminal, a signal quality experienced by the communication terminal and a type of data to be transmitted to or from the communication terminal.

Embodiment 60

A method as described in any of embodiments 57 to 59, comprising preferentially allocating channels that are assigned higher transmit powers to communication terminals that are experiencing poor signal quality.

Embodiment 61

A method as described in any of embodiments 57 to 60, comprising preferentially allocating channels that are assigned higher transmit powers to data that is associated with high importance.

Embodiment 62

A method as described in any of embodiments 57 to 61, comprising allocating a communication device more than one of said plurality of channels and assigning the combination of those allocated channels a transmit power that is an average of the transmit powers that were determined individually for those allocated channels.

Embodiment 63

A method as described in any of embodiments 57 to 62, comprising:
determining that having one or more of the plurality of channels transmit at a higher power, which will cause the power envelope of the plurality of channels to deviate from the power envelope defined by the second communication protocol, will not cause unacceptable interference to communication according to the second communication protocol; and
controlling transmissions across the one or more plurality of channels to occur at that higher power.

Embodiment 64

A method as described in any of embodiments 57 to 63, comprising allocating a different number of the plurality of channels to uplink communications from downlink communications.

Embodiment 65

A controller for allocating bandwidth to communication according to a first communication protocol in such a way as to minimise interference to communication according to a second communication protocol, the controller being configured to:
allocate bandwidth to form a plurality of channels in accordance with the first communication protocol, said channels having a different width from channels that are defined by the second communication protocol; and
individually determine a transmit power for each of said plurality of channels such that a power envelope formed by transmitting data across said plurality of channels in accordance with the first communication protocol substantially conforms to a power envelope that the second communication protocol defines for transmitting data across the allocated bandwidth.

Embodiment 66

A communication device for communicating according to a first communication protocol in such a way as to minimise interference to communication according to a second communication protocol, the communication device being configured to:
transmit data over one of a plurality of channels in accordance with the first communication protocol, said plurality of channels having a different width from channels that are defined by the second communication protocol; and
control its transmit power over that channel such that its transmission, in conjunction with transmissions over others of said plurality of channels in accordance with the first communication protocol, forms a power envelope that substantially conforms to a power envelope that the second communication protocol defines for transmitting data across the bandwidth that is allocated to the plurality of channels.

Embodiment 67

A method for allocating bandwidth to communication according to a first communication protocol, the method comprising:
identifying bandwidth that forms part of a channel for communication according to a second communication protocol;
dividing the identified bandwidth into a plurality of channels for allocating to communications according to the first communication protocol;
assigning one or more constraints to each channel, said constraints being applied non-uniformly across the identified bandwidth in dependence on the location of each allocated channel within the channel for communication according to the second communication protocol.

Embodiment 68

A controller for allocating bandwidth to communication according to a first communication protocol, the controller being configured to:
identify bandwidth that forms part of a channel for communication according to a second communication protocol;
divide the identified bandwidth into a plurality of channels for allocating to communications according to the first communication protocol;
assign one or more constraints to each channel, said constraints being applied non-uniformly across the identified bandwidth in dependence on the location of each allocated channel within the channel for communication according to the second communication protocol.

Embodiment 69

A communication device for communicating according to a first communication protocol, the communication device being configured to:
communicate over a channel in accordance with the first communication protocol, said channel being one of a plurality of channels formed from bandwidth that is comprised in a channel for communication according to a second communication protocol; and
control the communication to comply with one or more constraints applied to the channel such that the communication, in conjunction with communications over others of the plurality of channels, embodies a non-uniform application of constraints across the bandwidth occupied by the plurality of channels, said constraints being applied in dependence on the location of each of the plurality of channels within the channel for communication according to the second communication protocol.

Embodiment 70

A method substantially as herein described with reference to the accompanying drawings.

Embodiment 71

A controller substantially as herein described with reference to the accompanying drawings.

Embodiment 72

A communication device substantially as herein described with reference to the accompanying drawings.

What is claimed is:
1. A method for allocating bandwidth for communication according to a first communication protocol, the method performed by a controller comprising a processor executing instructions on a non-transitory computer readable medium, the method comprising:

identifying, by the controller, bandwidth that forms a guard band of a communication channel for communication according to a second communication protocol that is different from the first communication protocol; and allocating, by the controller, the identified bandwidth for communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth, wherein the allocation of the identified bandwidth comprises dividing the identified bandwidth into a plurality of channels and allocating each channel to a communication device configured to operate in accordance with the first communication protocol;

allocating to a communication device an uplink channel and a downlink channel that can be used simultaneously;

preferentially allocating a first one of said plurality of channels over a second one of said plurality of channels, if the bandwidth of the second channel is located closer to the bandwidth used for the channel carrying the communication according to the second communication protocol than the first channel; and associating a power constraint with each of the plurality of channels such that a first one of said plurality of channels is subject to a more restricted power constraint than a second one of said plurality of channels, the second channel being located closer to the bandwidth used for the channel carrying the communication according to the second communication protocol than the first channel.

2. The method as claimed in claim 1, further comprising leaving an inner guard band between the plurality of channels and a communication according to the second communication channel and an outer guard band between the plurality of channels and the edge of the communication channel, said inner guard band being wider than said outer guard band.

3. The method as claimed in claim 1, wherein the allocating, for a communication device, an uplink channel and a downlink channel comprises: allocating, for the communication device, an uplink channel that is formed of bandwidth comprised in the guard band of an uplink communication channel for communication according to the second communication protocol and a downlink channel that is formed of bandwidth comprised in the guard band of a downlink communication channel for communication according to the second communication protocol.

4. The method as claimed in claim 1, further comprising scheduling communications with the communication device to occur on the uplink and downlink channel at the same time.

5. The method as claimed in claim 1, further comprising scheduling communications between the communication device and a particular communication terminal with which the communication device communicates on only one of the uplink and the downlink channel at any one time.

6. The method as claimed in claim 1, comprising allocating a full width of a downlink channel to a downlink communication according to the first communication protocol.

7. The method as claimed in claim 1, further comprising dividing the uplink channel into a plurality of sub-channels such that each sub-channel can be allocated to a different uplink communication according to the first communication protocol.

8. The method as claimed in claim 7, further comprising individually pulse shaping each communication on an uplink sub-channel.

9. The method as claimed in claim 7, further comprising allocating a communication terminal a plurality of contiguous sub-channels for a single uplink communication.

10. The method as claimed in claim 9, further comprising pulse shaping the single uplink communication onto a single carrier.

11. The method as claimed in claim 7, further comprising scheduling communications on the plurality of sub-channels in dependence on a power with which one or more communication terminals have previously communicated with the communication device so as to avoid a combined receive power at the communication device across the plurality of sub-channels exceeding a predetermined threshold at any one time.

12. A controller for allocating bandwidth to communication according to a first communication protocol, the controller being configured to:

identify bandwidth forming a guard band of the communication channel for communication according to a second communication protocol that is different from the first communication protocol of a communication channel;

allocate the identified bandwidth for communication according to the first communication protocol, said allocation being performed non-uniformly across the identified bandwidth such that an allocation of a first portion of the identified bandwidth, which is located closer to a communication according to the second communication protocol than a second portion of the identified bandwidth, is constrained to a greater extent than an allocation of the second portion of the identified bandwidth;

divide the identified bandwidth into a plurality of channels;

allocate each channel to a communication device configured to operate in accordance with the first communication protocol;

allocate to a communication device an uplink channel and a downlink channel that can be used simultaneously;

preferentially allocate a first one of said plurality of channels over a second one of said plurality of channels, if the bandwidth of the second channel is located closer to the bandwidth used for the channel carrying the communication according to the second communication protocol than the first channel; and associate a power constraint with each of the plurality of channels such that a first one of said plurality of channels is subject to a more restricted power constraint than a second one of said plurality of channels, the second channel being located closer to the bandwidth used for the channel carrying the communication according to the second communication protocol than the first channel.

* * * * *